US012737389B1

(12) United States Patent
Gray et al.

(10) Patent No.: US 12,737,389 B1
(45) Date of Patent: Sep. 15, 2026

(54) ARTIFICIAL INTELLIGENCE ENABLED RECORDING OF OPERATIONAL EVENTS USING GRAMMAR-BASED PARSE TREES AND CONTEXT-OPTIMIZED DOCUMENTATION

(71) Applicant: GRVTY, Inc., Arlington, VA (US)

(72) Inventors: Spencer Gray, Herndon, VA (US); Paul Jordan, Columbia, MD (US); Kyle Markham, Columbia, MD (US)

(73) Assignee: GRVTY, INC., Arlington, VA (US)

( * ) Notice: Subject to any disclaimer, the term of this patent is extended or adjusted under 35 U.S.C. 154(b) by 0 days.

(21) Appl. No.: 19/378,185

(22) Filed: Nov. 3, 2025

(51) Int. Cl.
*G06F 16/31* (2019.01)

(52) U.S. Cl.
CPC .................................. *G06F 16/322* (2019.01)

(58) Field of Classification Search
CPC ..................................................... G06F 16/322
See application file for complete search history.

(56) References Cited

U.S. PATENT DOCUMENTS

2020/0133441 A1* 4/2020 Smith ................... G06F 3/0481
2023/0111052 A1* 4/2023 Ray ........................ G06N 5/022
704/9
2023/0409728 A1* 12/2023 Li ....................... G06F 16/9024
2025/0291906 A1* 9/2025 Kim ...................... G06F 21/554
2025/0371049 A1* 12/2025 Braganza .......... G06F 16/33295
2025/0378048 A1* 12/2025 Bhat .................. G06F 16/1748

* cited by examiner

*Primary Examiner* — Courtney Harmon
(74) *Attorney, Agent, or Firm* — GALVIN PATENT LAW LLC; Brian R. Galvin

(57) ABSTRACT

Disclosed embodiments provide systems and methods for recording operational events using artificial intelligence (AI). User input and corresponding telemetry data are combined into an input stream, which is processed by a grammar engine to generate an initial parse tree. This parse tree is then transmitted to a Model Context Protocol (MCP) server, which interfaces with an AI agent to produce an updated parse tree. The updated tree includes additional events and/or enhanced details that were absent from the original input. By enriching operational notes (opnotes) with previously omitted information, the disclosed techniques enable context-aware, grammar-based documentation of operational activity.

20 Claims, 12 Drawing Sheets

Receive information from MCP server
850

Identify required grammar elements for each event type
852

Compare populated nodes against required structure
854

Detect missing/ambiguous nodes
856

Cross-reference with external context
858

Assign confidence scores to inferred insertions
860

Flag documentation gaps for insertion generation
862

ARTIFICIAL INTELLIGENCE ENABLED RECORDING OF OPERATIONAL EVENTS USING GRAMMAR-BASED PARSE TREES AND CONTEXT-OPTIMIZED DOCUMENTATION

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present disclosure relates to intelligence analysis systems, and more particularly to systems and methods for recording operational events.

Discussion of the State of the Art

Modern data generation has reached extraordinary scale, encompassing a wide array of formats and sources. Enterprises, government entities, and other organizations routinely produce massive volumes of information through digital platforms, sensor networks, and communication systems. New data streams emerge constantly, from sources including automated devices, social media activity, remote sensing technologies, and transactional logs, contributing to a dynamic and increasingly complex data environment. This surge in data availability offers both promise and complexity, as analysts and intelligent systems must sift through vast, heterogeneous datasets to extract meaningful insights. The process of organizing, correlating, and searching across these diverse inputs demands substantial computational resources and advanced analytical techniques to uncover patterns, trends, and actionable knowledge.

Data generated from diverse sources can exhibit multiple dimensions, including temporal and spatial aspects that provide critical context for analysis. Temporal characteristics may include timing, duration, sequences, or recurring patterns within data streams, while spatial characteristics may involve locations, movement, or distribution across physical or virtual environments. These multidimensional properties introduce complexity in data modeling, requiring techniques that can effectively account for interrelationships between time and space, as well as potential correlations across disparate data points. The ability to manage and leverage these aspects is essential for understanding underlying structures, predicting events, and identifying areas of interest within large-scale datasets, particularly when information is dynamic, distributed, or continuously evolving.

The timely analysis of multimodal data has implications across a wide array of applications and enterprise contexts, from operational planning to strategic decision-making. Efficient processing of information can support rapid situational awareness, risk assessment, and resource allocation, while delayed or incomplete analysis can lead to missed opportunities or unintended consequences. Consequently, there is an ongoing need to develop and refine techniques for integrating, analyzing, and interpreting complex data from multiple sources in a timely and reliable manner. Continuous improvements in computational methods, data management frameworks, and analytical strategies are essential for ensuring that organizations can effectively leverage the wealth of information available in increasingly data-rich environments.

SUMMARY OF THE INVENTION

Accordingly, disclosed embodiments provide systems and methods for recording operational events using artificial intelligence (AI). User input and corresponding telemetry data are combined into an input stream, which is processed by a grammar engine to generate an initial parse tree from a template. The template can be filled in from user input, operational metadata, and details from prior operational history. This parse tree is processed by a Model Context Protocol (MCP) server, which interfaces with an AI agent to produce an updated parse tree. The updated parse tree may include additional events or enhanced details that were absent from the original input. By enriching operational notes (opnotes) with previously omitted information, the disclosed techniques enable context-aware, grammar-based documentation of operational activity. Furthermore, Structured records provide a key advantage: trainees can follow coherent operational narratives that demonstrate both actions and reasoning. The grammar-enforced format prevents important contextual details from being omitted, improving reproducibility of expert workflows.

According to an aspect of an embodiment, there is provided a computing system for artificial intelligence assisted recording of operational events, the computing system comprising one or more hardware processors configured for: receiving an activity feed; inputting the activity feed to an input preprocessor to create a preprocessed input stream; inputting the preprocessed input stream to a grammar engine, wherein the grammar engine is configured and disposed to generate an initial parse tree, wherein the initial parse tree is based on operational activity; providing the initial parse tree to a Model Context Protocol (MCP) server, wherein the MCP server executes one or more MCP tools; executing an AI agent, wherein the AI agent is configured to monitor operational activity, and analyze the initial parse tree to detect documentation gaps; generating one or more grammar-compliant insertions based on the detected documentation gaps; creating a real-time parse tree by copying the initial parse tree; and updating the real-time parse tree to include the generated insertions in an operational notes file structure.

According to an aspect of an embodiment, the computing system is further configured to provide the one or more grammar-compliant insertions to a human operator for validation.

According to an aspect of an embodiment, the AI agent is further configured to perform automated cross-referencing between related events based on shared attributes.

According to an aspect of an embodiment, the shared attributes include at least one of timestamps, operational context, and actor identity.

According to an aspect of an embodiment, the MCP server is configured to expose subtrees based on a predetermined condition.

According to an aspect of an embodiment, the predetermined condition includes at least one of a relevance threshold and an operational priority.

According to an aspect of an embodiment, the relevance threshold is determined based on semantic proximity to recent operational events.

According to an aspect of an embodiment, the real-time parse tree includes a Concrete Syntax Tree (CST).

According to an aspect of an embodiment, the real-time parse tree includes an Abstract Syntax Tree (AST).

According to an aspect of an embodiment, the computing system is further configured for multi-user operation across distributed teams, and wherein the real-time parse tree is synchronized across multiple user sessions in real time.

According to an aspect of an embodiment, real-time synchronization of the real-time parse tree across multiple user sessions is achieved using one or more of, a distributed ledger, a version control protocol, a conflict resolution engine configured to reconcile concurrent edits, and a synchronization service configured to propagate validated changes to all active user interfaces.

According to an aspect of an embodiment, the computing system is further configured to generate analytic outputs based on the real-time parse tree, the analytic outputs comprising one or more of statistical summaries, causal chains, documentation completeness scores, and anomaly density metrics.

According to an aspect of an embodiment, the opnotes file structure includes a field for storing a timestamp, wherein the timestamp indicates when an operational event was recorded.

According to an aspect of an embodiment, the opnotes file structure includes a field for specifying an event type, wherein the event type is selected from a predefined set of categories including command execution, system response, and operator observation.

According to an aspect of an embodiment, the opnotes file structure includes one or more fields for storing technical details associated with the operational event, the technical details comprising at least one of system identifiers, command parameters, output values, and contextual metadata.

According to an aspect of an embodiment, there is provided a computer-implemented method for artificial intelligence (AI) assisted recording of operational events, the method comprising: receiving an activity feed; inputting the activity feed to an input preprocessor to create a preprocessed input stream; inputting the preprocessed input stream to a grammar engine, wherein the grammar engine is configured and disposed to generate an initial parse tree, wherein the initial parse tree is based on operational activity; providing the initial parse tree to a Model Context Protocol (MCP) server, wherein the MCP server executes one or more MCP tools; executing an AI agent, wherein the AI agent is configured to monitor operational activity, and analyze the initial parse tree to detect documentation gaps; generating one or more grammar-compliant insertions based on the detected documentation gaps; and creating a real-time parse tree by copying the initial parse tree; and updating the real-time parse tree to include the generated insertions in an operational notes (opnotes) file structure.

According to an aspect of an embodiment, there is provided a non-transitory computer-readable medium comprising programming instructions for an electronic computation device executable by one or more processors to cause the electronic computation device to: receive an activity feed; input the activity feed to an input preprocessor to create a preprocessed input stream; input the preprocessed input stream to a grammar engine, wherein the grammar engine is configured and disposed to generate an initial parse tree, wherein the initial parse tree is based on operational activity; provide the initial parse tree to a Model Context Protocol (MCP) server, wherein the MCP server executes one or more MCP tools; execute an AI agent, wherein the AI agent is configured to monitor operational activity, and analyze the initial parse tree to detect documentation gaps; generate one or more grammar-compliant insertions based on the detected documentation gaps; create a real-time parse tree by copying the initial parse tree; and update the real-time parse tree to include the generated insertions in an operational notes (opnotes) file structure.

BRIEF DESCRIPTION OF THE DRAWING FIGURES

DETAILED DESCRIPTION OF THE INVENTION

Figure 1:
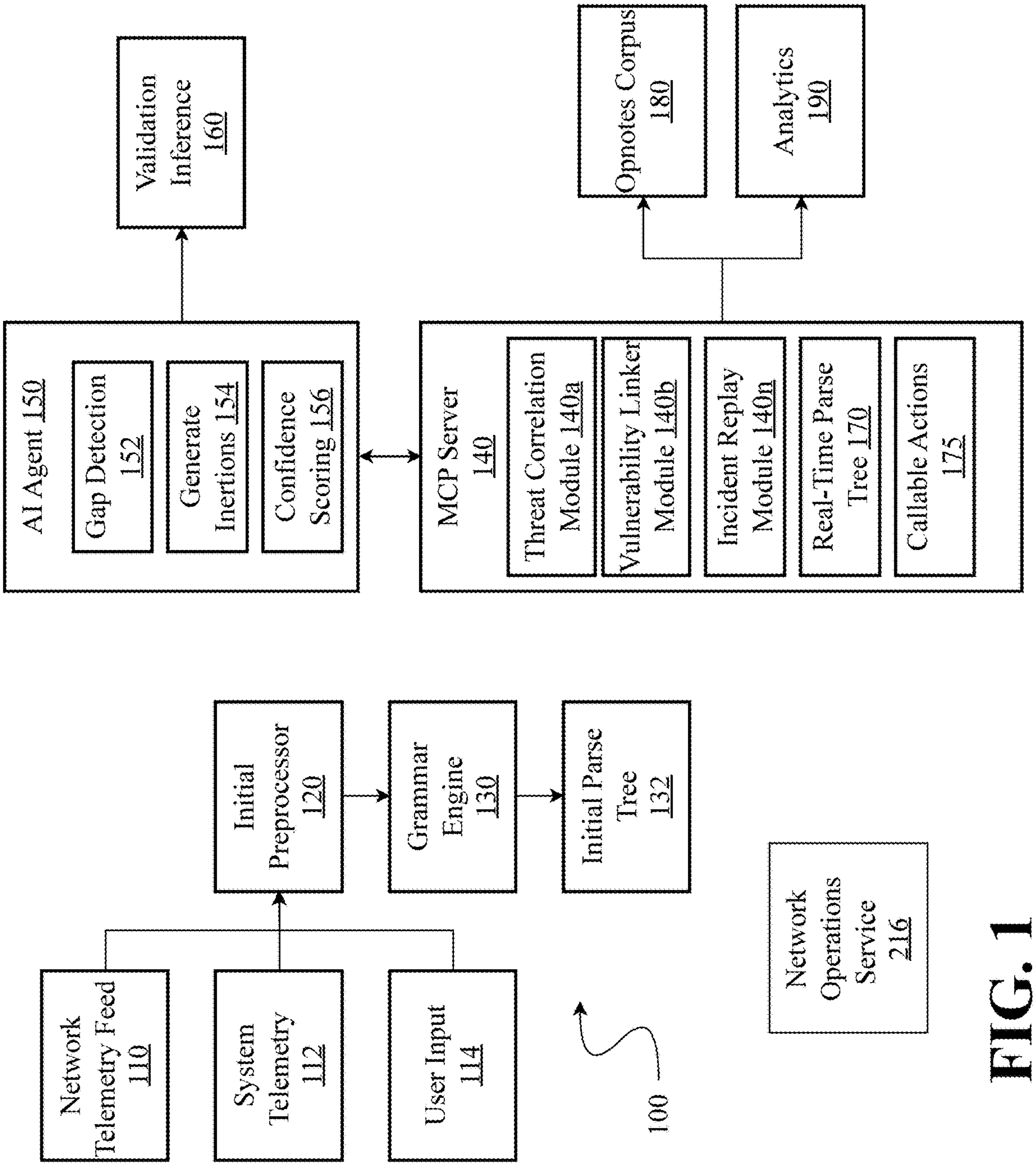
FIG. 1 is a comprehensive system architecture for artificial intelligence (AI) assisted recording and documentation of cyber operations, employing grammar-based parse trees with Model Context Protocol (MCP) driven selective context exposure to achieve context-optimized documentation.

In high-stakes operational environments such as cybersecurity operations, emergency medical response, and industrial process monitoring, the ability to document events accurately and comprehensively is very important. Operational records, such as logs and operational notes ("opnotes") serve not only as real-time decision support tools but also as foundational artifacts for post-event analysis, training, auditing, and regulatory compliance.

Despite their importance, maintaining high-quality documentation during active operations presents significant challenges. Human operators often work under intense pressure, where time and attention are limited. As a result, events may be omitted entirely or recorded in abbreviated, inconsistent formats. The level of technical detail and narrative structure can vary widely between operators, reducing the utility of the records for downstream use. Moreover, manual documentation diverts cognitive resources away from core operational tasks, potentially impacting performance and situational awareness.

Disclosed embodiments address the aforementioned problems by providing a system and method for AI-assisted documentation of operational events using grammar-based parse trees and context-optimized data exposure. The system combines user input and telemetry signals into structured input streams, which are processed by a grammar engine to generate initial parse trees. These trees are transmitted to a Model Context Protocol (MCP) server, which interfaces with an AI agent to identify missing events or incomplete details. The AI agent produces updated parse trees that enrich the operational record while preserving context efficiency and minimizing operator burden.

In some embodiments, a human-in-the-loop workflow is maintained to ensure oversight and promote the accuracy of operational documentation. While the AI agent may suggest additions or refinements to the parse tree, final validation and approval can be performed by a human operator. This approach enables the system to leverage AI for efficiency and completeness while preserving human judgment in the creation of opnotes. By integrating human review into the documentation process, disclosed embodiments help mitigate the risk of erroneous or misleading entries and support the generation of trustworthy operational records One or more embodiments can utilize language models and machine learning models that can process natural-language instructions to extract structured tasking parameters, including collection modality, geographic coverage, revisit timing, resolution, and priority. From these inputs, a system generates one or more executable tasking strategies, ranks them based on feasibility and predicted collection value, and selects appropriate assets from a multi-modal sensor inventory spanning geospatial, cyber, electromagnetic, and behavioral intelligence sources. Feedback from analyst validation and historical tasking success is used to update tasking models over time.

To support unified cross-domain reasoning, one or more embodiments can make use of a latent hyperspace construction subsystem that can create coherent multi-modal representations. A cross-modal latent fusion engine employs contrastive learning to align representations across cyber, imagery, RF, and text modalities by projecting each modality into a common embedding space with shared geometric structure. Embeddings are aligned through learned similarity functions or joint training objectives, resulting in a unified latent hyperspace. A manifold optimization engine enforces topological and causal smoothness within the latent space using techniques such as Lorentzian autoencoders or diffusion-based models to preserve temporal continuity and anomaly separability. A latent terrain mapper identifies operational zones within the hyperspace, including adversary-preferred latent clusters and under-observed latent corridors, facilitating proactive coverage strategies. In some embodiments, the latent terrain mapper identifies latent safe zones-regions exhibiting sparse observation density or underutilized sensor coverage-which may indicate exploitable terrain for adversary maneuver or deception. A latent embedding archive stores temporally indexed representations of tracked entities for backtracing, attribution, and long-term behavioral trend analysis.

One or more embodiments may utilize resources such as a geodesic modeling and anomaly detection engine that can perform behavioral modeling across time-indexed latent embeddings. A geodesic behavior learner learns baseline trajectories representing typical adversary activity across domains and encodes event progressions such as reconnaissance, staging, and execution. A latent anomaly detector identifies deviations from learned trajectories, co-occurrences of domain signals that are statistically rare, and dislocations indicative of emerging threats. A device cohesion detector identifies coordinated device movement patterns such as unit-level staging or force assembly. A cross-modality query engine links anomalies across domains, while a causal path inference engine reconstructs latent trajectories by analyzing anomalies across multiple domains, performing both backward and forward causal tracing to identify latent precursors and project downstream consequences. This supports cross-domain anomaly triangulation, allowing detection of previously unlinked threat indicators across cyber, RF, and geospatial sources.

In one or more embodiments, incoming information can be scored against both physical and latent forecasts. Behavior alignment scores are computed to quantify conformity with predicted paths. When deviations exceed configured thresholds, alerts are issued and automated retasking initiated. Adversarial behaviors—such as trajectory spoofing or decoy use—are detected using latent anomaly classifiers and are used to refine behavior models and update scoring thresholds dynamically.

Group-level reasoning is supported by associating entities into coherent behavioral clusters across latent and physical domains. Group cohesion scores reflect alignment in space, time, velocity, and behavioral markers, enabling detection of convoy behavior, distributed staging, or decoupling maneuvers.

Custody records are maintained for each entity and include latent space association history in addition to physical tracking continuity. When continuity falls below threshold, a custody reacquisition process is initiated, including retroactive correlation, alternate hypothesis generation, and task plan modification. The reacquisition workflow may use latent drift patterns to guide recovery efforts.

Although specific implementations and workflows have been described herein, various modifications and alternative configurations may be employed without departing from the inventive concepts. Variations in latent space construction, geodesic modeling, twin maintenance, deterrence simulation, system topology, or user interface design are all considered within the scope of the disclosure. Functional components may be implemented in hardware, software, firmware, or hybrid configurations adapted to specific mission or operational requirements.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "operational note" or "opnote" refers to a record of activity, observation, or event generated during the execution of a task or mission within an operational environment. Opnotes may include user-entered annotations, system-generated entries, or AI-suggested content, and may serve as documentation for situational awareness, post-operation review, training, auditing, or compliance. Opnotes may be structured according to grammar-based parse trees and may be stored, transmitted, or displayed using standardized formats.

As used herein, "Model Context Protocol" or "MCP" refers to an industry-standard structured execution framework with a formal specification that enables task-specific processing of data such as parse trees. An MCP may define operational parameters, input/output formats, and orchestration logic for executing a given analytic or response task. MCPs are utilized by AI agents and other agentic entities in response to user prompts, though in some cases may be instantiated by them. MCPs may coordinate with ontology-based reasoning systems, plugin repositories, and response layers to support multi-domain deterrence operations.

As used herein, "parse tree" refers to a structured representation of input data generated by a grammar engine, wherein nodes correspond to syntactic elements and hierarchical relationships reflect grammatical dependencies. Parse trees may encode user input, telemetry signals, or system events in a format suitable for downstream processing, including AI-assisted analysis, validation, and augmentation. Parse trees may be transmitted to external systems, such as Model Context Protocol (MCP) servers, and may be updated to reflect inferred or missing information.

As used herein, "grammar engine" refers to a software component configured to parse input data according to predefined syntactic rules and generate structured representations, such as parse trees. Grammar engines may process user input, telemetry signals, and/or system events, and may enforce consistency, completeness, and compliance with domain-specific grammar models. Grammar engines may support modular rule sets, context-sensitive parsing, and integration with downstream components such as AI agents, validation systems, or documentation frameworks As used herein, "AI agent" refers to a computational entity configured to perform automated analysis, inference, or generation tasks based on input data and contextual parameters. AI agents may interface with grammar engines, parse trees, and/or external protocols to identify missing information, suggest refinements, or augment operational records. AI agents may operate in real-time or asynchronously, and may be constrained by context filters, validation protocols, and/or human-in-the-loop workflows to ensure accuracy, relevance, and trustworthiness of generated outputs.

As used herein, "scoring output" refers to a structured set of metrics computed by fusion scoring engine that quantifies behavioral conformity, identity continuity, and operational significance of observed activity. Scoring outputs may include behavior alignment scores, identity confidence scores, group cohesion scores, and custody degradation indicators. Scoring outputs may further include alert triggers, ISR retasking recommendations, and campaign feedback data, and may be annotated with source lineage, campaign identifiers, and timestamp metadata. Scoring outputs are disseminated to other subsystems such as dynamic tasking subsystem, campaign coordinator, or multi-source intelligence fusion system.

As used herein, "custody record" refers to a persistent data structure maintained by custody record manager that tracks the continuity, identity confidence, behavioral history, and source provenance of a monitored entity over time. A custody record may include version-controlled updates, scoring histories, lineage identifiers, and temporal annotations. Custody records support reacquisition workflows, confidence decay logic, and analytical auditing of entity behavior across interrupted, ambiguous, or deceptive reporting environments.

As used herein, "latent space" refers to a mathematical embedding space in which multi-modal intelligence data is transformed into unified, semantically structured representations. Latent space is constructed by disclosed embodiments through the application of contrastive learning, geometric manifold optimization, and cross-modal encoding. The latent space supports behavior modeling, anomaly detection, entity comparison, and geodesic trajectory analysis by representing diverse sensor observations (e.g., imagery, cyber logs, RF signals, text) as standardized vectors within a common space, preserving proximity relationships that reflect behavioral or operational similarity.

As used herein, "digital twin" refers to a real-time latent model of a physical entity, operational region, or infrastructure element, constructed and maintained by latent twin monitor subsystem. A digital twin encodes expected behavioral patterns, operational cycles, and geospatial signatures using learned baselines and behavioral templates. Each twin maintains a current latent position, historical trajectory, and confidence envelope reflecting acceptable behavioral variance. Digital twins support continuous monitoring, anomaly scoring, and simulation-based forecasting.

As used herein, "confidence envelope" refers to a multi-dimensional boundary in latent space representing the acceptable behavioral variance for a digital twin. Confidence envelopes are computed by confidence envelope tracker using historical variance, entity classification, and operational constraints, and are used to detect divergence from expected behavior. When current latent behavior exceeds the bounds of the confidence envelope, an alert is generated and may trigger simulation, retasking, or escalation.

As used herein, "geodesic trajectory" refers to a time-ordered path through latent space that represents the most behaviorally plausible progression of a tracked entity or digital twin over time. Geodesic trajectories are generated by geodesic behavior learner using baseline movement patterns, historical activity, and environmental constraints. These trajectories serve as predictive references for scoring deviation and forecasting future behavior.

As used herein, "latent anomaly" refers to a deviation from expected behavioral patterns detected within latent space by latent anomaly detector. A latent anomaly may include unexpected trajectory shifts, cross-modal inconsistencies, or statistically rare co-occurrence patterns, and is evaluated using scoring models to determine operational significance.

Conceptual Architecture

FIG. 1 presents a comprehensive system architecture diagram for artificial intelligence (AI) assisted recording and documentation of cyber operations, employing grammar-based parse trees with Model Context Protocol (MCP) driven selective context exposure to achieve context-optimized documentation 100. The architecture begins with three distinct data source categories positioned on the left side of the diagram. The Network Telemetry Feed 110 ingests real-time security-relevant data including intrusion detection system (IDS) and intrusion prevention system (IPS) alerts, stateful firewall logs capturing connection attempts and protocol anomalies, and deep packet captures for forensic analysis. The System Telemetry 112 component processes operating system event logs, application-layer audit trails, authentication and authorization attempts including failed login sequences, and process execution chains that may indicate lateral movement or privilege escalation. User input 114 captures human-generated annotations from security analysts conducting threat hunting operations, red-team operators documenting exploitation attempts and defensive evasion techniques, and incident responders recording remediation actions and containment measures.

These heterogeneous data streams converge at the input preprocessor 120, which performs critical normalization operations essential for downstream processing. The preprocessor executes format normalization to convert disparate data schemas into a unified representation, performs timestamp harmonization across systems with different clock sources and time zones, implements tokenization to segment continuous streams into discrete semantic units suitable for grammatical parsing, removes duplicate entries that may arise from redundant logging mechanisms or multiple sensor observations of the same event, filters irrelevant noise using configurable relevance thresholds, and annotates each entry with comprehensive metadata including source reliability weights, geolocation tags derived from IP addresses or GPS coordinates, environmental conditions, and operator identity markers. The preprocessor validates data against grammar entry rules, checking for required fields, enforcing syntactic constraints, verifying semantic coherence, and ensuring compatibility with downstream parse tree generation. For sensitive environments, the preprocessor may employ fast symmetric encryption algorithms for data-at-rest with asymmetric key exchange for secure credential management, ensuring confidentiality throughout the processing pipeline.

The preprocessed stream feeds into the grammar engine 130, which implements formal syntactic and semantic parsing to generate an initial parse tree 132. The Grammar Engine maintains dual parsing capabilities, supporting both Concrete Syntax Trees (CST) when precise syntactic fidelity is required for preserving exact token order, punctuation, and formatting for downstream validation or reconstruction, and Abstract Syntax Trees (AST) when semantic interpretation and logical structure take precedence over surface syntax, enabling tasks such as event classification, causal inference, and AI-assisted augmentation. The engine enforces grammar rules expressed in Backus-Naur Form or similar formal specifications, organizing events according to hierarchical structures that capture actor-action-object-timestamp-jurisdiction relationships while detecting missing entities, null nodes, semantically underspecified elements, and temporal inconsistencies that require augmentation. The initial parse tree 132 represents a structured, hierarchical interpretation that captures both the explicit content and implicit relationships within the operational data stream, with each node maintaining fields for timestamps indicating when operational events were recorded, event types selected from predefined categories including command execution, system response, and operator observation, and technical details comprising system identifiers, command parameters, output values, and contextual metadata.

The Initial Parse Tree 132 is transmitted to the Model Context Protocol (MCP) Server 140, which functions as an intelligent context management and orchestration platform hosting multiple specialized analytical modules 142_a_-142_n_. The threat correlation module 142_a_ performs cross-system event mapping to identify coordinated attack campaigns, correlating seemingly disparate indicators across network, endpoint, and application layers to reveal advanced persistent threat (APT) behaviors, while maintaining association histories for entity tracking and behavioral clustering. The vulnerability linker module 142_b_ associates observed exploitation attempts with Common Vulnerabilities and Exposures (CVE) databases, enriching events with vulnerability severity scores from the Common Vulnerability Scoring System (CVSS), available patches from vendor advisories, and compensating controls from security configuration baselines. The incident replay module 142_n_ reconstructs attack sequences for forensic analysis, simulating adversary tactics, techniques, and procedures (TTPs) mapped to the MITRE ATT&CK framework to validate detection coverage and identify defensive gaps in the security posture.

The MCP Server 140 implements selective subtree exposure algorithms that evaluate multiple criteria to determine which portions of the parse tree should be exposed to the AI Agent. These algorithms consider relevance thresholds computed based on semantic proximity to recent operational events using vector similarity measures in latent space, operational priority classifications derived from asset criticality and threat severity matrices, computational resource constraints including available memory and processing capacity, and security classifications that may restrict access to certain operational details. This selective exposure mechanism prevents context overload while preserving essential situational awareness, addressing fundamental limitations of conventional AI documentation systems that attempt to process entire operational streams without discrimination. The MCP Server may integrate with latent space construction subsystems that create coherent multimodal representations through contrastive learning, aligning cyber, imagery, RF, and text modalities by projecting each into a common embedding space with shared geometric structure, enabling cross-domain reasoning about security events.

The MCP Server 140 establishes bidirectional communication with an AI Agent 150, which performs multi-stage analysis to enhance operational documentation. The Gap Detection subsystem 152 systematically identifies required grammar elements for each event type, evaluates populated fields against the grammar-defined structure to locate missing or incomplete nodes, detects ambiguous references that lack sufficient specificity, identifies temporal gaps where expected events are absent from the sequence, and invokes pruning routines to remove or collapse irrelevant branches when nodes are determined to be inapplicable, thereby optimizing memory utilization and processing cycles. The generate insertions subsystem 154 cross-references multiple external context sources to resolve identified gaps, including system logs from standard logging directories, firewall configuration databases containing rule sets and policy definitions, network traffic analysis derived from packet captures and flow records, historical entries in the opnotes corpus providing precedent and pattern matching, and correlated telemetry from related systems offering complementary perspectives on events. The Confidence Scoring subsystem 156 computes calibrated probability scores for each candidate insertion using an ensemble of evidence signals including model-based likelihoods from machine learning classifiers trained on historical operational data, statistical correlations derived from log analysis and pattern matching, provenance and source reliability weights based on sensor fidelity and historical accuracy, timestamp alignment with known event sequences, consistency with recent operational context, and calibration factors derived from historical operator accept/reject outcomes in the validation workflow.

In some embodiments, MCP server 140 comprises one or more real-time parse tree data structures. An MCP server 140 may define operational parameters, input/output formats, and orchestration logic for executing a given analytic or response task. AI agents 150 connect directly to MCP servers, which contain real-time parse trees and other relevant data. MCPs are utilized by AI agents and other agentic entities in response to user prompts, though in some cases may be instantiated by them. Through their modular, single-purpose design, MCP servers may coordinate with ontology-based reasoning systems, plugin repositories, and response layers to support multi-domain deterrence operations. The MCP server provides an interface which abstracts away some of the complexity of the parse tree to reduce the processing load of a given AI agent. Instead, the AI agent only interfaces with the MCP server which manages the parse tree.

In various embodiments, the system of FIG. 1 employs a MCP server in which the actions 175 available to an AI agent are exposed as MCP tools. MCP tools are callable functions with structured parameters (e.g., JSON-schema-defined fields) and machine-readable results that trigger external effects or state transitions in the system. Tools are distinct from MCP resources, which are read-only context providers; tools do things, while resources inform those actions. By constraining agent interaction to tool invocation rather than free-form editing, the system achieves deterministic validation, auditable side effects, and predictable failure semantics.

Traditional MCP tools utilized by the system include, by way of example and not limitation, file and code operations (reading and writing files, invoking formatters or tests, executing bounded shell commands), web and HTTP operations (fetching URLs, issuing parameterized REST/RPC calls), source control and DevOps actions (creating branches, committing changes, initiating CI/CD tasks, querying logs), productivity integrations (creating or reading calendar events, sending or drafting emails, inserting notes or documents, opening tasks), and data operations (issuing SQL/NoSQL queries, performing vector-store search/upsert, running retrieval pipelines). In enterprise deployments, additional tools may map to organizational systems, such as creating or updating CRM/ERP records, filing support tickets, or performing HRIS lookups. Each tool declares preconditions, parameter types, expected postconditions, and error codes, allowing the orchestration layer to accept, adapt, or reject agent proposals with deterministic behavior.

To reduce cognitive load and improve reliability, the internal document grammar and parse-tree structures may not be surfaced as tools or resources. Instead, the MCP server presents higher-level, typed intents (e.g., classify an event, propose field values, request a constrained mutation, validate against a schema)

that encapsulate the underlying tree operations. When an agent invokes a tool that would violate grammar constraints or organizational policy, the MCP server returns a structured refusal alongside corrective hints and a shortlist of valid alternatives. This separation of concerns bounds the agent's branching factor, preserves interface stability as the internal grammar evolves, and yields consistent, reproducible outcomes across different model providers and versions.

The AI agent's proposals are forwarded to a Validation Interface 160, which implements a comprehensive human-in-the-loop workflow enabling analysts to maintain oversight and accountability in the documentation process. The interface presents proposed insertions with associated confidence scores and supporting evidence, enabling operators to accept insertions that accurately reflect operational reality, edit proposals to correct minor inaccuracies or add additional context, reject insertions that are erroneous or misleading, and optionally redact sensitive information that should not be preserved in the permanent record. The interface supports role-based access controls aligned with security clearance levels and operational responsibilities, maintains comprehensive audit trails documenting all acceptance, rejection, and modification decisions, provides contextual explanations for AI proposals to facilitate informed decision-making, and enables batch processing of multiple proposals for efficiency during high-tempo operations. This human oversight mechanism ensures that final opnotes reflect both AI-assisted enhancements and human judgment, promoting accuracy, accountability, and trustworthiness in operational documentation.

In some embodiments, validated insertions flow to a Real-Time Parse Tree, which maintains the authoritative current operational state through sophisticated distributed synchronization mechanisms. The parse tree may be implemented using a distributed ledger providing immutable, cryptographically-secured record keeping with consensus mechanisms ensuring consistency across nodes, or a version control protocol enabling branching, merging, and rollback capabilities similar to software development workflows. The infrastructure supports multi-user synchronization across concurrent analyst sessions, employing conflict resolution engines to reconcile simultaneous edits from multiple operators, synchronization services to propagate validated changes to all active user interfaces in real-time, and eventual consistency models to balance responsiveness with accuracy in distributed deployments. This architecture ensures that all team members operate with a consistent, up-to-date view of operational documentation, critical for coordinated incident response and red team exercises where multiple analysts may be documenting different aspects of the same operational sequence.

In some aspects, the real-time parse tree feeds into two critical downstream components. First, an Opnotes Corpus 180 serves as a secure historical repository for finalized operational records, implemented as a versioned database system with cryptographic integrity verification, supporting full-text search and structured queries across historical events. The corpus enables Training functions where historical accept/reject decisions refine AI confidence scoring models, successful insertion patterns improve gap detection algorithms, and operator feedback adjusts relevance thresholds and context windows. It also supports grammar evolution through adaptive refinement of parsing rules based on observed operational patterns, statistical analysis of common event structures and sequences, incorporation of new event types as threats evolve, and optimization of grammar rules to reduce ambiguity and improve parsing efficiency. In some embodiments, an opnotes file is scoped to a single operator and a single workday, such that it aggregates all operationally significant events authored by that operator during that day. This scoping allows AI agents to traverse multiple opnotes files associated with a given target or engagement and rapidly reconstruct current status, historical context, and pending actions without wading through unrelated material. To further streamline agent interaction, the system routes requests through an MCP server that manages the underlying concrete syntax tree; the agent invokes typed tools and receives structured results, while the CST and low-level tree manipulations remain encapsulated. This separation reduces complexity for the agent, improves reliability, and preserves a stable interface even as the internal grammar evolves. Second, an Analytics and Reporting module 190 generates comprehensive operational intelligence outputs including documentation completeness scores measuring coverage and detail levels across operational phases, incident timelines reconstructing attack progressions and defensive responses, anomaly density metrics quantifying the concentration and distribution of unusual events, statistical summaries of operational tempo and resource utilization, causal chains linking initial compromise to ultimate impact, and compliance reports demonstrating adherence to documentation standards and regulatory requirements.

The architecture optionally incorporates a network operations service 216 that provides supplementary context through internal and external network analysis capabilities. This service interfaces with network infrastructure to retrieve configuration states from routers, switches, and firewalls, monitors traffic patterns for behavioral anomalies and protocol violations, correlates network events with endpoint and application-layer observations, and provides topology awareness for understanding lateral movement paths and segmentation boundaries. The dashed connection to the MCP Server indicates its optional but valuable contribution to contextual enrichment, particularly in environments where network behavior provides critical indicators of adversary activity.

A feedback loop from the Opnotes Corpus back to the Grammar Engine enables continuous improvement through historical pattern analysis and grammar refinement, creating an adaptive system that evolves with operational practices and threat landscapes. The architecture incorporates multimodal input stream capabilities enabling voice commands transcribed through speech-to-text engines, keystroke logs capturing command-line interactions, GUI interactions recorded through screen capture APIs, and system responses from automated defensive tools to be encoded into a single grammar-compliant structure, providing seamless integration of diverse data types into a unified operational record. The entire system operates with selective context exposure at its core, maintaining computational efficiency while preserving operational security, implementing human oversight through validation workflows that balance automation with accountability, supporting distributed team operations through sophisticated synchronization mechanisms, and producing structured, searchable, and analytically-valuable documentation suitable for immediate operational support, post-action review, training scenarios, compliance auditing, and long-term knowledge retention.

Figure 2:
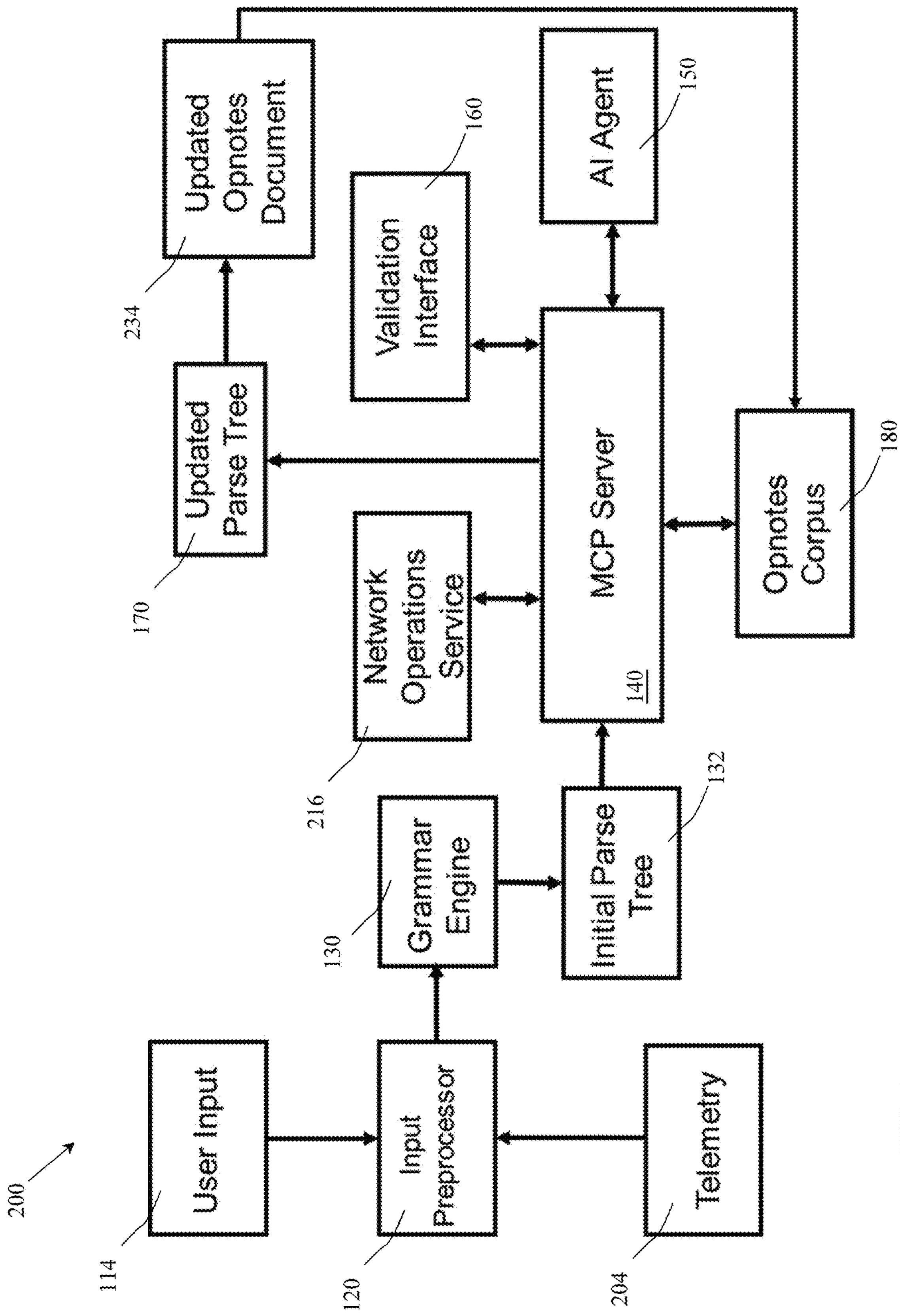
FIG. 2 is a block diagram illustrating an exemplary architecture to support AI-enabled recording of operational events using grammar-based parse trees and context-optimized documentation.

FIG. 2 is a block diagram 200 illustrating an exemplary architecture for AI-assisted recording of operational events using grammar-based parse trees and context-optimized documentation. User input 114 may include manually entered notes based on observed events, relayed information, and/or other operator-generated content. Telemetry data 204 may include sensor readings, automated surveillance outputs, system log entries, and/or similar machine-generated signals. An input preprocessor 120 receives both user input 114 and telemetry data 204, performing preprocessing operations to generate a unified input stream. This input stream is provided to a grammar engine 130, which is configured to generate an initial parse tree 132. The initial parse tree 132 represents a hierarchical structure of the input stream, with fields such as actor, object, and event, among others, organized according to domain-specific grammar rules. The initial parse tree 132 is transmitted to an MCP server 140, which is a computing system configured to host and manage multiple Model Context Protocol (MCP) modules. In some embodiments, MCPs may be implemented as pluggable components, each capable of performing defined operations such as anomaly detection, semantic enrichment, compliance tagging, causal inference, and other analytical tasks.

The MCP server 140 interfaces with an AI agent 150. In various embodiments, the MCP server 140 functions as a context filter, selectively exposing portions of the initial parse tree 132 to the AI agent 150. This selective exposure enables the AI agent 150 to analyze, augment, and optimize documentation without processing the entire tree, thereby improving computational efficiency. The AI agent 150 may be configured to monitor ongoing operations, detect missing or ambiguous entries, and propose grammar-compliant additions to enhance the quality and completeness of operational notes. By focusing only on relevant subtrees, the AI agent 150 conserves key computing resources such as processor cycles and memory bandwidth, while maintaining high responsiveness. In embodiments, the MCP server is configured to expose subtrees based on a predetermined condition. In embodiments, the predetermined condition includes at least one of a relevance threshold and an operational priority. In this way, disclosed embodiments enable selective context sharing with AI agents, reducing computational overhead while preserving critical situational awareness.

In embodiments, a relevance threshold refers to a computed metric used to determine whether a given subtree or information item within a parse tree warrants exposure to an AI agent for further analysis or augmentation. The relevance threshold can serve as a gating mechanism, enabling selective context sharing that balances completeness with computational efficiency. In embodiments, the relevance threshold is determined based on semantic proximity to recent operational events.

In one or more embodiments, a validation interface 160 enables human operators to review, accept, reject, or modify AI-generated suggestions, thereby maintaining oversight and accountability. The validation interface 160 may communicate with the MCP server 140 via exposed APIs, such as RESTful interfaces or similar protocols. Through coordinated interaction with the AI agent 150, the MCP server 140 can produce an updated real-time parse tree 170. The parse tree may be implemented in various formats including, but not limited to, concrete syntax trees and abstract syntax trees. This updated parse tree 170 may include modifications to existing fields, insertion of new nodes, or enrichment of contextual annotations derived from both human and AI contributions.

The updated parse tree 170 may be used to generate an enhanced, updated opnotes document 180, which incorporates additional relevant information that may have been omitted from the original input stream. These enriched opnotes provide context-optimized documentation suitable for real-time use and post-operation analysis. In addition to updated information, the updated opnotes document 234 can include metrics such as confidence levels and anomaly density metrics. One or more embodiments are further configured to generate analytic outputs based on the real-time parse tree, the analytic outputs comprising one or more of statistical summaries, causal chains, documentation completeness scores, and anomaly density metrics. In one or more embodiments, the anomaly density metrics can include a measure of the concentration and distribution of anomalous events within a defined temporal or spatial window, such as the number of anomalies per minute of operation and the ratio of flagged events to total events within a subsystem, and may be computed by sliding window aggregation across event logs or vector-based clustering of anomaly classifications using unsupervised learning techniques. One or more embodiments can support a multi-modal input stream that enables voice commands, keystroke logs, and system responses to be encoded into a single grammar-compliant structure. This feature can provide seamless integration of diverse data types into a unified operational record, enhancing accessibility and reducing fragmentation across input modalities.

In some embodiments, the updated opnotes document 234 may be stored in an opnotes corpus 180. The opnotes corpus 180 serves as a historical repository that can be accessed by MCP modules for model fine-tuning and retraining. In embodiments, one or more embodiments can further include adaptive grammar evolution, in which the grammar specification dynamically adjusts over time based on operator feedback, usage statistics, and/or domain-specific shifts. This ensures that the documentation structure remains aligned with actual operational practices, improving usability and long-term relevance. In embodiments, the opnote corpus 180 may support multi-user operation. In embodiments, the opnote corpus may be implemented as a secure database, blockchain ledger, versioned database system, and/or other suitable structure. In embodiments the computing system is further configured for multi-user operation across distributed teams, and wherein the real-time parse tree is synchronized across multiple user sessions in real time. In some embodiments, real-time synchronization of the real-time parse tree across multiple user sessions is achieved using one or more of, a distributed ledger, a version control protocol, a conflict resolution engine configured to reconcile concurrent edits, and a synchronization service configured to propagate validated changes to all active user interfaces.

Human operator feedback captured via the validation interface 160 may be incorporated into a retraining process, enabling the system to adapt over time and produce increasingly accurate and efficient documentation with minimal human intervention. In some embodiments, the MCP server 140 may interface with a network operations service 216. The network operations service 216 can provide access to internal or external networks, enabling retrieval and analysis of network traffic, system alerts, and communication logs. This service may supplement the input stream with additional context derived from observed network activity, such as connection attempts, protocol anomalies, and/or correlated system events. By incorporating network-derived insights into the parse tree, the system can enhance the completeness and relevance of operational notes, particularly in environments where network behavior is a critical component of situational awareness.

Figure 3:
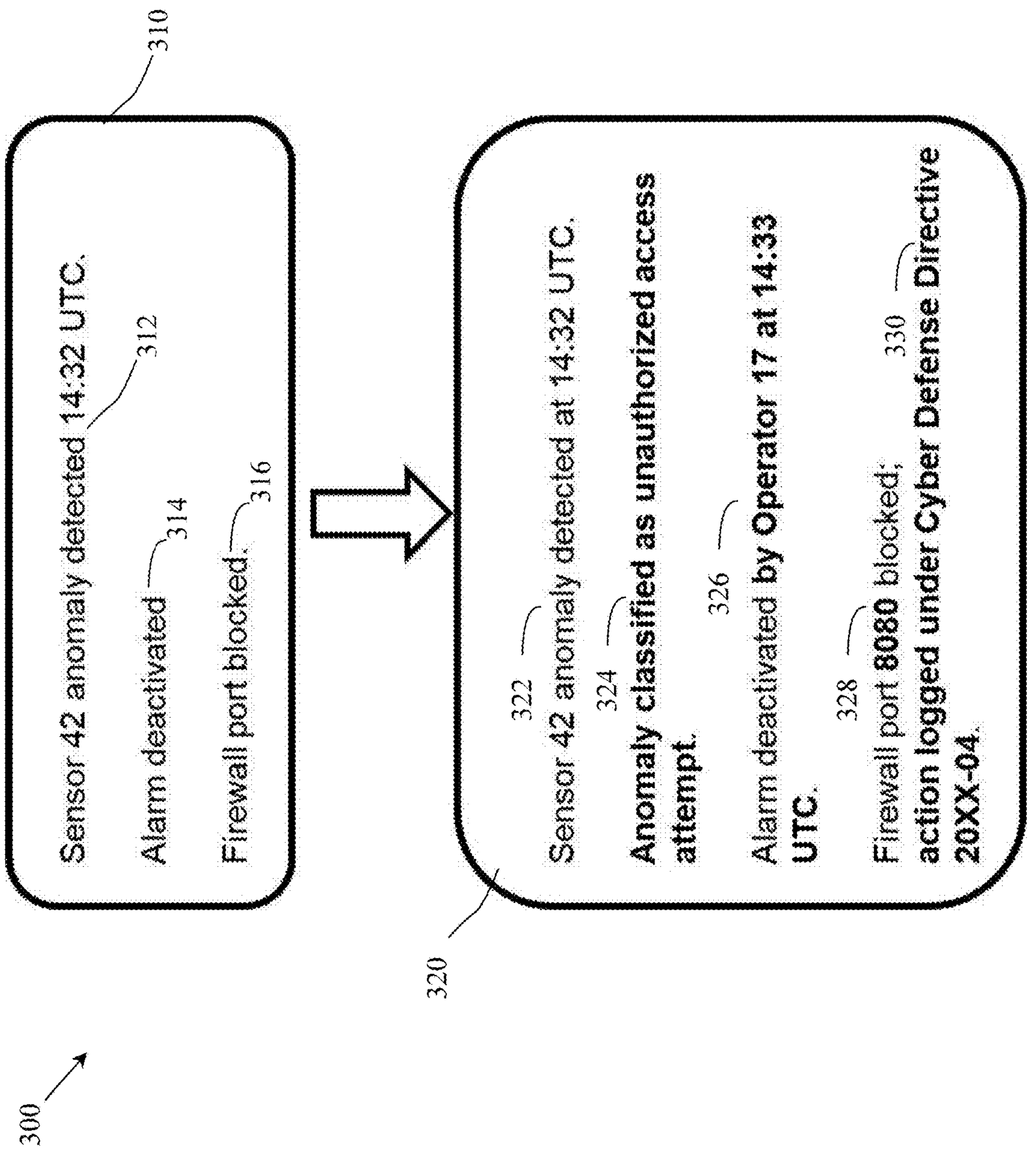
FIG. 3 illustrates an example of automatic enhanced opnotes generation, in accordance with one or more embodiments.

FIG. 3 illustrates an example 300 of automatic enhanced opnotes generation, in accordance with one or more embodiments. In the example shown, input stream 310 includes three distinct items of information. Information item 312 comprises a telemetry report from a sensor, accompanied by a timestamp. Information item 314 includes a user-provided entry stating "alarm deactivated." Similarly, information item 316 includes a user-provided entry stating "firewall port blocked."

Updated opnotes document 320 represents the output generated from input stream 310 after processing by a disclosed embodiment. As shown, the opnotes document 320 includes four items of information. Information item 322 is a direct copy of the telemetry report originally provided as item 312. Information item 324 is a newly generated entry, derived from context analysis of the input stream. In this example, item 324 classifies the anomaly as an unauthorized access attempt. In some embodiments, context analysis may be performed by one or more machine learning models, such as a large language model (LLM), which can enrich telemetry events like item 322 with additional context useful for real-time decision-making and post-operation review.

Item 326 illustrates enhancement of a user-provided input from the original stream. Referring again to item 314, the input merely states "alarm deactivated" without specifying who performed the action or when it occurred. Grammar engines can generate parse trees that include entities such as actors and timestamps, effectively capturing the "who" and "when" of an event. When such entities are missing, as in item 314, disclosed embodiments may infer the missing details through context analysis, log scraping, historical data, or other available sources. In the updated opnotes, item 326 annotates the original event with an actor and timestamp, indicating that the alarm was deactivated by operator 17 at 14:33 UTC."

Likewise, item 328 provides enriched context for item 316 from the input stream. While item 316 simply notes that a firewall port was blocked, it lacks specifics. In contrast, item 328 identifies the blocked port (port 8080) and includes an additional annotation, item 330, indicating the authority or rationale behind the action. In some embodiments, the AI agent, via access to the network operations service and other system components, can supplement operator actions with missing details. For instance, a human operator may be under time pressure and omit critical information such as which port was disabled as a result of a firewall configuration. Disclosed embodiments can retrieve this data by scanning system logs (e.g., /var/logs) or detecting changes in network traffic patterns, and update the opnotes accordingly. This approach can enable a more complete and accurate record of coordinated activities.

Figure 4:
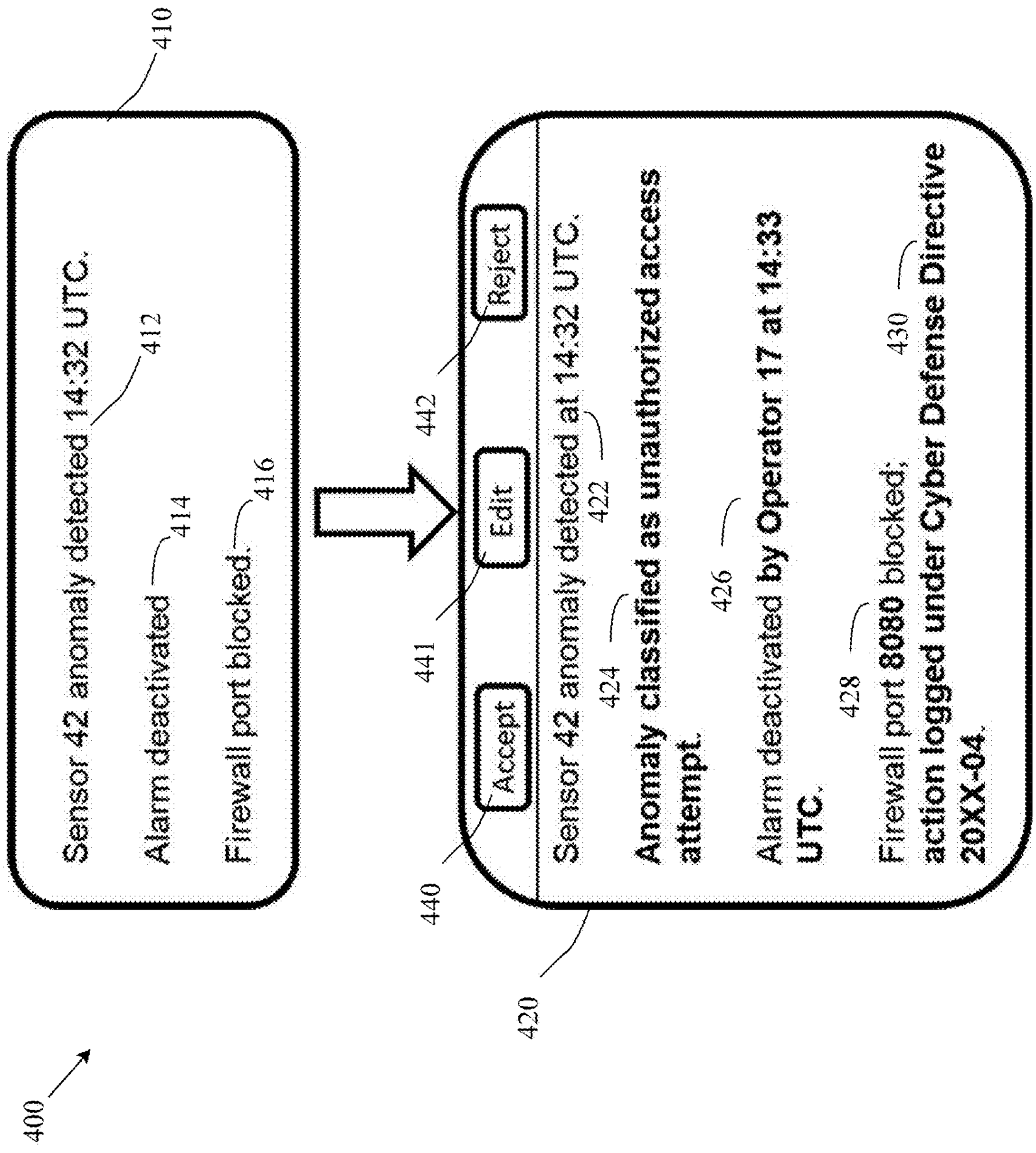
FIG. 4 illustrates an example of enhanced opnotes generation with an operator confirmation option, in accordance with one or more embodiments.

FIG. 4 illustrates an example 400 of enhanced opnotes generation with operator confirmation, in accordance with one or more embodiments. The figure includes an input stream 410 that is structurally similar to input stream 310 of FIG. 3. Information item 412 comprises a telemetry report from a sensor, accompanied by a timestamp. Information item 414 includes a user-provided entry stating "alarm deactivated," while information item 416 includes a user-provided entry stating "firewall port blocked."

In contrast to the embodiment shown in FIG. 3, which performs automatic annotation and enhancement, the embodiment of FIG. 4 incorporates human oversight via an opnote validation interface 420. The opnote validation interface 420 includes interactive controls such as an accept button 440, an edit button 441, and a reject button 442. In some embodiments, the opnote validation interface 420 may be configured to require operator review of each proposed addition or modification generated by the system. For example, an operator may choose to accept information item 422, reject information item 424, accept items 426 and 428, and edit item 430. This human-in-the-loop workflow ensures that final opnotes reflect both AI-assisted enhancements and human judgment, thereby promoting accuracy, accountability, and trustworthiness in operational documentation. One or more embodiments can include providing the one or more grammar-compliant insertions to a human operator for validation. In some embodiments, in addition to the buttons shown in FIG. 4, other buttons, such as a "Redact" button may also be included. The redact button can enable selective redaction mechanisms and access controls that can limit visibility of sensitive nodes in the parse tree. These features can preserve confidentiality while maintaining analytic utility, making disclosed embodiments suitable for regulated or classified environments. Thus, disclosed embodiments can provide selective context exposure and human-in-the-loop validation, yields technical advantages not obtainable by straightforward combination. These advantages can include reduced computational overhead, improved accuracy, and enhanced security.

Figure 5:
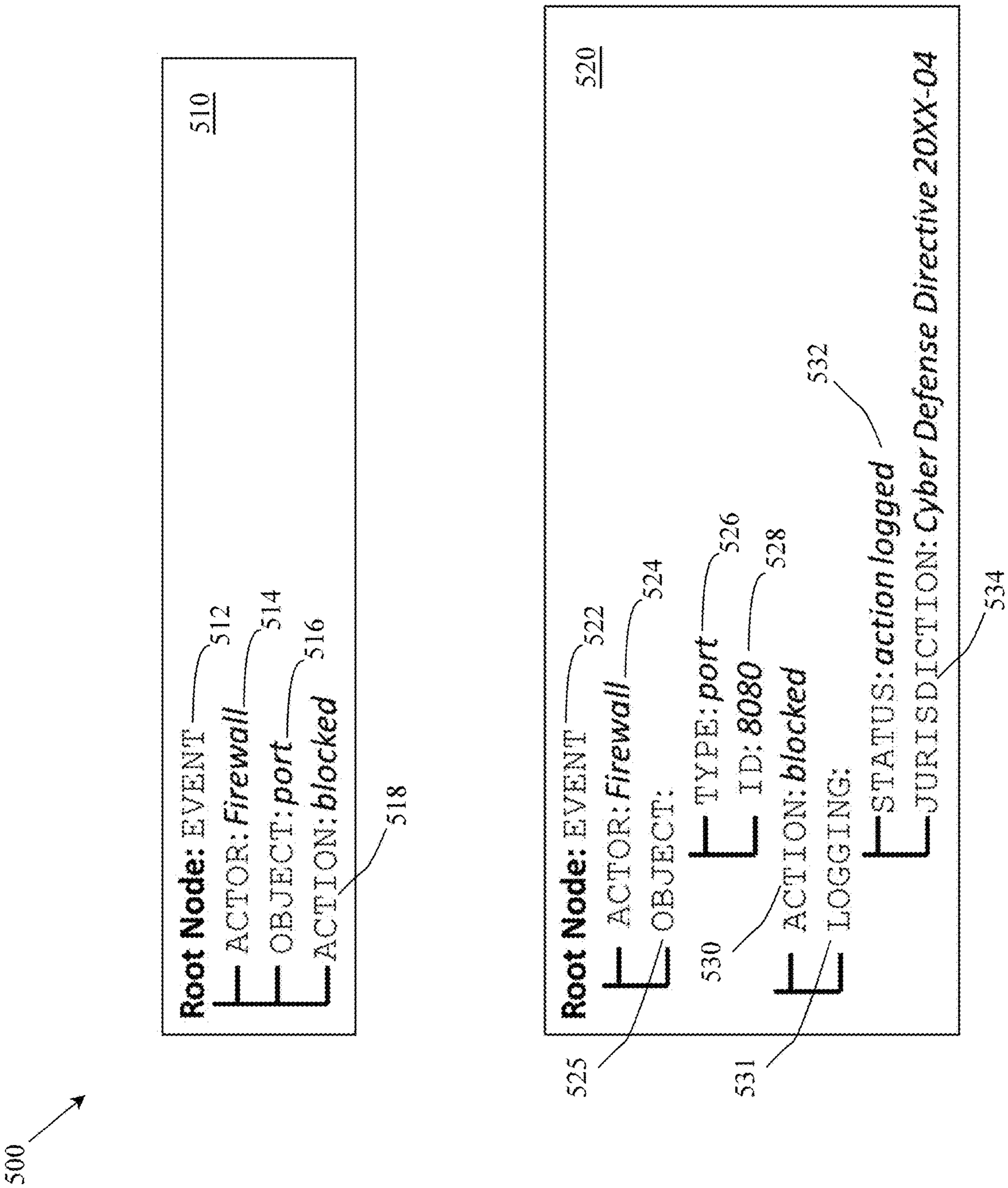
FIG. 5 shows an exemplary initial parse tree and corresponding updated real-time parse tree, in accordance with one or more embodiments.

FIG. 5 illustrates an example 500 that includes an initial parse tree and a corresponding updated real-time parse tree, demonstrating how disclosed embodiments enrich structured representations of operational events. The initial parse tree 510 includes a root node of type "event," indicated at 512. Branching from the root are three child nodes: node 514 of type "actor," with a value of "firewall"; node 516 of type "object," with a value of "port"; and node 518 of type "action," with a value of "blocked." This initial structure captures the basic elements of the event but lacks specificity and contextual depth.

The corresponding updated real-time parse tree, shown at 520, reflects enhancements derived from contextual analysis. Like the initial tree, it includes a root node of type "event," indicated at 522, with a child node 524 of type "actor" and a value of "firewall." However, the "object" node 525 is now expanded into a subtree: it includes a child node 526 of type "type" with a value of "port," and an additional child node 528 of type "ID" with a value of "8080." This enriched structure provides greater specificity, enabling downstream systems and human reviewers to better understand the nature of the event. The updated tree also retains a child node 530 of type "action," with a value of "blocked," consistent with the original parse tree.

Beyond structural enrichment, the updated real-time parse tree 520 includes a new branch for logging metadata, indicated by node 531. This branch includes child node 532 with a type "status" and a value of "action logged," and child node 534 with a type "jurisdiction" and a value of "cyber defense directive 20XX-04." These additions provide traceability and regulatory context, supporting compliance and auditability in mission-critical environments.

In various embodiments, the updated real-time parse tree 520 is generated by an AI agent in coordination with the MCP server, based on the initial parse tree 510 and additional contextual inputs. These inputs may be derived from system logs, historical records, machine learning inference, or other suitable sources. By applying grammar-based parsing and context-aware augmentation, disclosed embodiments can identify missing or incomplete elements, populate parse trees with enriched data, and generate updated opnotes that reflect a more complete and accurate account of operational activity. This approach enhances documentation quality in high-stakes domains such as cybersecurity, infrastructure monitoring, and emergency response.

In embodiments, the real-time parse tree includes a Concrete Syntax Tree (CST). In some embodiments, the real-time parse tree includes an Abstract Syntax Tree (AST). The Concrete Syntax Tree (CST) can be used when precise syntactic fidelity is required, such as preserving exact token order, punctuation, and formatting for downstream validation or reconstruction. CSTs have advantages in scenarios involving grammar enforcement, syntax highlighting, and round-trip editing, where the original structure must be retained. Similarly, the Abstract Syntax Tree (AST) is well-suited for use when semantic interpretation and logical structure are prioritized over surface syntax. ASTs provide advantages in tasks such as event classification, causal inference, and AI-assisted augmentation, where higher-level abstractions are more useful than raw syntax.

In some embodiments, a combination of various types of parse tree can be used, allowing the system to toggle between syntactic precision and semantic generalization depending on the operational context. Beyond CST and AST, other embodiments may further include Dependency Trees, which represent grammatical relationships between tokens; Semantic Trees, which encode meaning-based relationships and roles; and Hybrid Trees, which combine elements of CST and AST to support layered analysis. These diverse tree structures enable flexible and context-aware documentation workflows that adapt to the needs of both human operators and AI agents. The parse-trees can correspond to an opnote file structure. In embodiments, the opnotes file structure includes a field for storing a timestamp, wherein the timestamp indicates when an operational event was recorded. In some embodiments, the opnotes file structure includes a field for specifying an event type, wherein the event type is selected from a predefined set of categories including command execution, system response, and operator observation. In some embodiments, the opnotes file structure includes one or more fields for storing technical details associated with the operational event, the technical details comprising at least one of system identifiers, command parameters, output values, and contextual metadata. In embodiments, the real-time parse tree 520 can be stored as an operational notes (opnotes) file structure.

Figure 6:
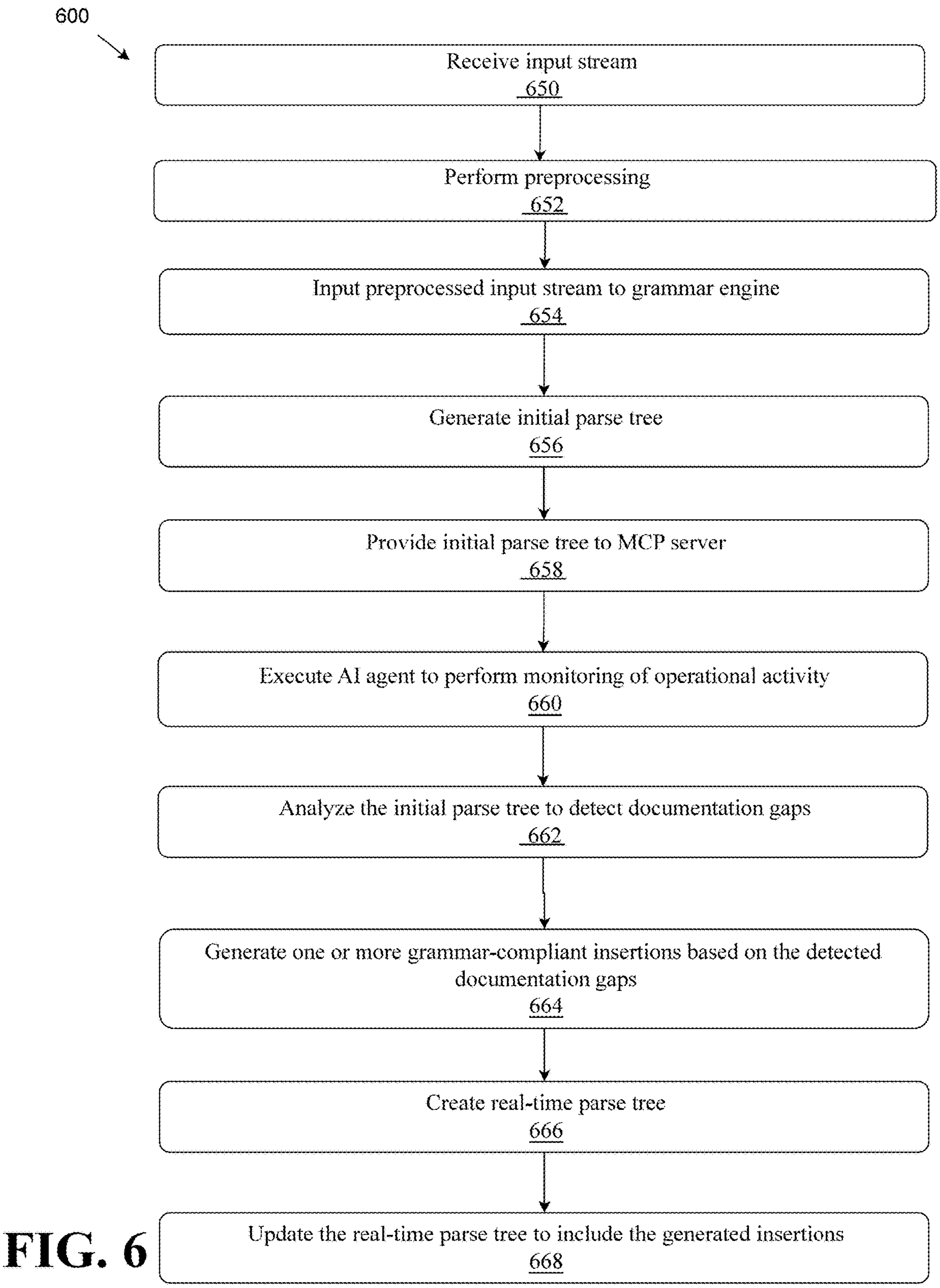
FIG. 6 is a flow diagram illustrating an exemplary method for AI-enabled recording of operational events using grammar-based parse trees and context-optimized documentation, in accordance with one or more embodiments.

FIG. 6 is a flow diagram 600 illustrating an exemplary method for AI-enabled recording of operational events using grammar-based parse trees and context-optimized documentation. The process begins at block 650, where an input stream is received. In various embodiments, the input stream may include user annotations, telemetry data from sensors, system logs, and other relevant sources. This diverse data forms the foundation for subsequent analysis and documentation.

At block 652, the input stream undergoes preprocessing. This step may include operations such as spell checking, range validation, and temporal correlation of events. These preprocessing functions help normalize and structure the data, ensuring that it is suitable for grammar-based parsing. In embodiments, the AI agent is further configured to perform automated cross-referencing between related events based on shared attributes. In embodiments, the shared attributes include at least one of timestamps, operational context, and actor identity. At block 654, the cleaned and validated input stream is provided to a grammar engine, which generates an initial parse tree at block 656. The parse tree represents a structured, hierarchical interpretation of the input, organizing elements such as actors, actions, objects, and timestamps according to predefined grammar rules.

At block 658, the initial parse tree is transmitted to an MCP server, which serves as a coordination hub for context-aware processing. At block 660, the AI agent is executed to monitor operational activity, leveraging information from one or more MCP modules. At block 662, the AI agent and/or MCP server analyze the initial parse tree to detect documentation gaps. This analysis may include techniques such as disambiguation, natural language processing, sentiment analysis, and other machine learning methods to identify missing or incomplete information that could impact the clarity or completeness of operational records.

Once documentation gaps are identified, block 664 initiates the generation of grammar-compliant insertions to address those gaps. At block 666, a real-time parse tree is created, and at block 668, the tree is updated to incorporate the newly generated insertions. In some embodiments, a human operator may act as a gatekeeper, reviewing proposed additions via an opnote validation interface, to accept, reject, or modify entries before finalizing the opnotes. This human-in-the-loop mechanism ensures that AI-assisted documentation remains accurate, accountable, and aligned with operational realities.

Figure 7:
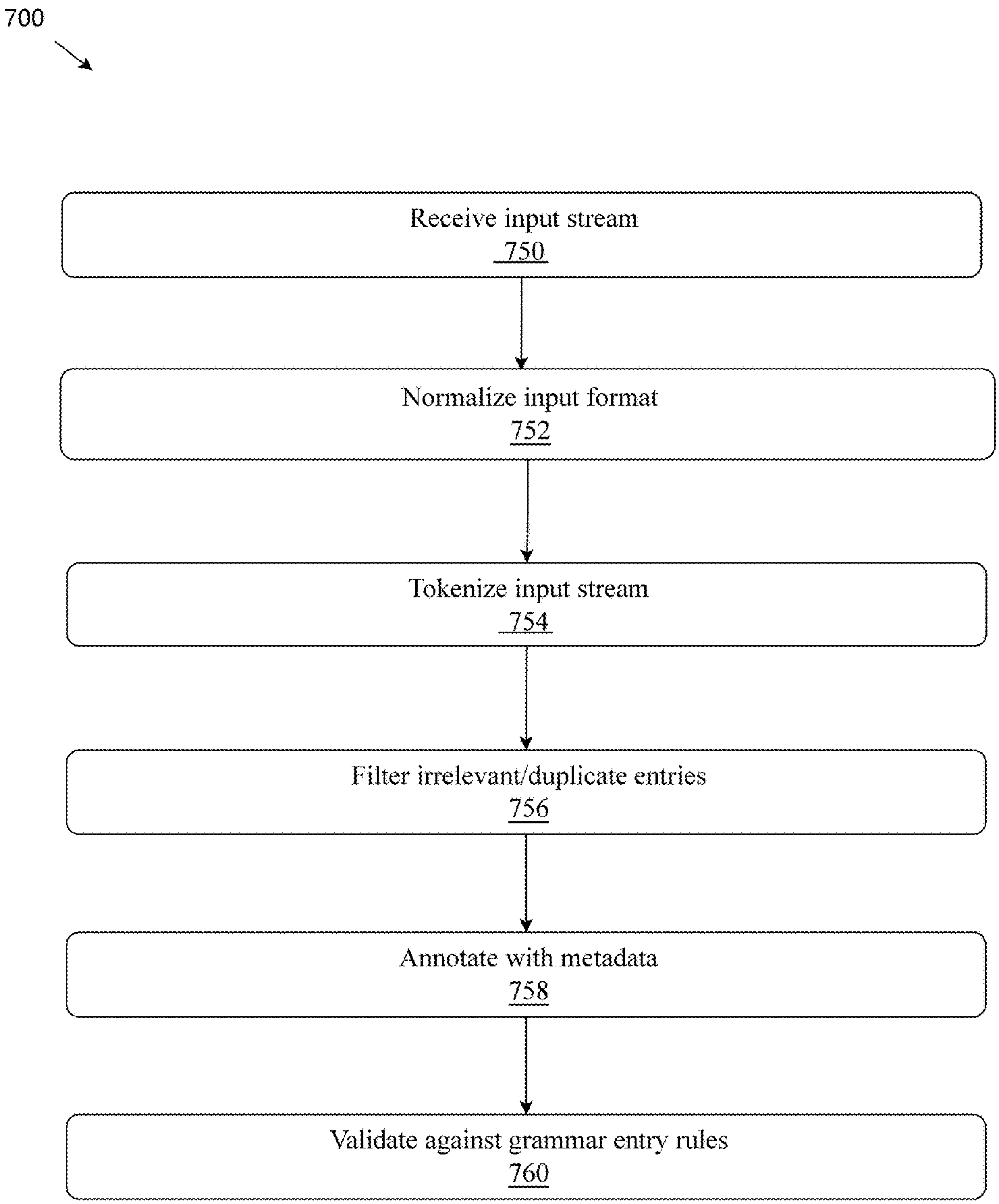
FIG. 7 is a flow diagram illustrating preprocessing of the input stream, in accordance with one or more embodiments.

FIG. 7 is a flow diagram 700 illustrating preprocessing of the input stream, in accordance with one or more embodiments. At block 750, an input stream is received. The input stream may include user-generated input, such as typed annotations or voice-to-text entries, along with telemetry data from sensors, system logs, and/or automated surveillance systems. In some embodiments, the input stream may be encrypted using fast symmetric encryption algorithms, with asymmetric encryption employed for secure conveyance of keys, certificates, and other associated credentials. This ensures confidentiality and integrity of sensitive operational data during transmission and processing.

At block 752, the input format is normalized. This can include converting disparate data formats into a unified schema, resolving encoding inconsistencies, standardizing timestamp formats, and/or harmonizing field labels across different sources. Normalization may also involve aligning terminology to a controlled vocabulary or domain-specific ontology, thereby improving downstream parsing accuracy. At block 754, the normalized input stream is tokenized. Tokenization may include identifying parts of speech, segmenting sentences, and separating tokens based on temporal arrival, semantic category, and/or source type. This structured breakdown facilitates grammar-based parsing and contextual analysis.

At block 756, duplicate and/or irrelevant entries are removed. This filtering step reduces noise in the data and minimizes unnecessary computational overhead for the AI agent, allowing system resources to focus on meaningful content. At block 758, the remaining information is annotated with metadata. Metadata may include timestamps, geolocation data, environmental conditions, operator identity, and/or situational context. These annotations enrich the input stream and support traceability, compliance, and auditability. Finally, at block 760, the data is validated against grammar entry rules. This validation may include checking for required fields, enforcing syntactic constraints, verifying semantic coherence, and/or ensuring compatibility with downstream parse tree generation. In this way, disclosed embodiments ensure that only well-formed, contextually relevant data proceeds to the next stage of processing.

Figure 8:
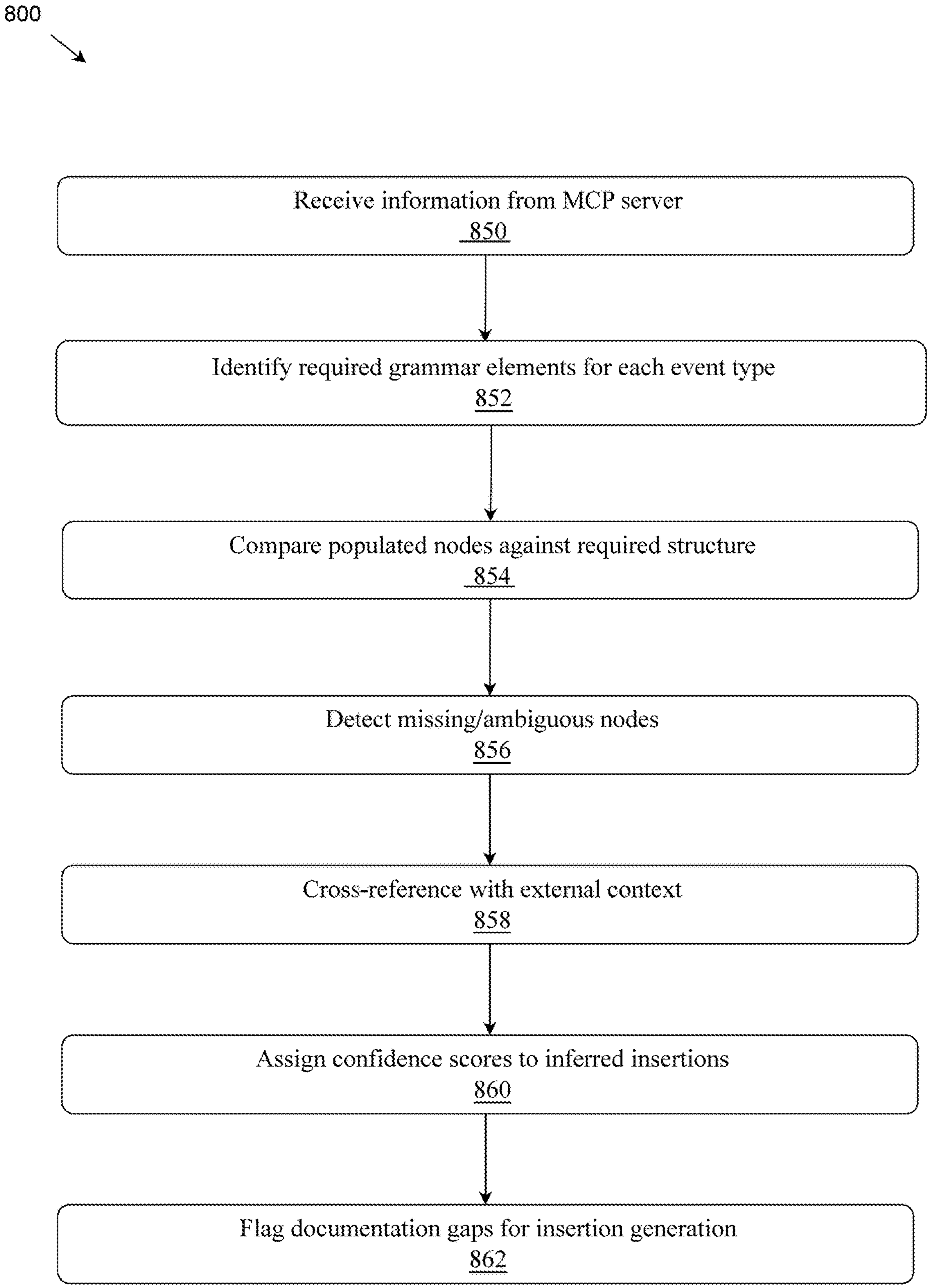
FIG. 8 is a flow diagram illustrating AI agent analysis of an initial parse tree for detecting documentation gaps, in accordance with one or more embodiments.

FIG. 8 is a flow diagram 800 illustrating AI agent analysis of an initial parse tree for detecting documentation gaps. The process begins at block 850 where the MCP server provides an interface to a subset of the initial parse tree or selected child branches to the AI agent for focused analysis. At block 852 the AI agent identifies the set of required grammar elements for the event type under review, such as object, action, actor, status, and/or jurisdiction. At block 854 populated notes are evaluated against the required structure defined by the grammar engine. Where a node is inapplicable the agent invokes a pruning routine to remove or collapse the irrelevant branch, thereby simplifying the parse tree and reducing consumption of compute resources such as memory, processing cycles, and network bandwidth.

At block 856 the AI agent detects missing or ambiguous nodes by locating required nodes that are empty, null, or semantically underspecified. Detected gaps are classified by type, for example missing identifier, missing timestamp, ambiguous actor, or incomplete rationale. At block 858 the agent cross-references external context sources to resolve gaps, including system logs, firewall records, network traffic captures, historical opnotes in the opnotes corpus, and/or related telemetry. Cross-referencing yields candidate supplemental values such as a specific port number, an inferred actor identity, or a corroborating timestamp.

At block 860 the AI agent assigns a confidence score to each candidate insertion. Confidence scores can be computed using an ensemble of evidence signals including model-based likelihoods from one or more machine learning classifiers, statistical correlations from log analysis, provenance and/or source reliability weights, and calibration factors derived from historical operator accept/reject outcomes. The scoring process incorporates metadata such as timestamp alignment, source trust level, and/or consistency with recent events to produce a calibrated probability that a candidate insertion is correct.

At block 862 candidate insertions are flagged for generation. In embodiments, candidate insertions are flagged only when their confidence score exceeds a predetermined threshold. In embodiments, candidates below the threshold may be queued for human review, used to prompt follow-up data collection, or discarded. Flagged insertions are formatted as grammar-compliant insertions and returned to the MCP server for downstream processing, which can include automatic integration into an updated parse tree and/or presentation to an operator via the opnote validation interface for accept, edit, or reject actions. This pipeline balances automated augmentation with conservatism to minimize erroneous documentation while preserving efficiency and traceability.

As can now be appreciated, disclosed embodiments can provide systems and methods for annotating existing information and supplementing missing details in operational note (opnote) documents. By leveraging grammar-based parse trees, AI-assisted context analysis, and human-in-the-loop validation, the system ensures that operational records are both comprehensive and trustworthy. This approach improves situational awareness, supports post-operation review, and reduces the burden on human operators by automating the detection and resolution of documentation gaps. Thus, disclosed embodiments go beyond providing relief for immediate operational burdens, and also create structured data assets that improve long-term analysis, compliance, and institutional knowledge retention.

It will be understood that the foregoing use case examples are presented for illustrative purposes only and are not intended to be limiting. The examples demonstrate how disclosed embodiments may operate in coordination with base system components to annotate existing operational data, identify documentation gaps, and generate enriched opnotes using grammar-based parse trees and AI-assisted context analysis. However, the systems and methods described herein are broadly applicable across a wide range of operational domains, including cybersecurity, infrastructure monitoring, emergency response, and mission-critical logistics.

Other non-limiting use case examples may include documenting coordinated incident response across distributed teams, supplementing sparse field reports with inferred environmental context, enriching security logs with actor attribution and jurisdictional metadata, and/or reconstructing operational timelines from fragmented telemetry and human annotations. In each case, disclosed embodiments may ingest structured and unstructured inputs, normalize and tokenize the data, generate initial parse trees, and apply context-aware augmentation to produce comprehensive and trustworthy documentation. The resulting opnotes may support real-time decision-making, post-operation review, compliance auditing, and long-term trend analysis.

In some embodiments, the system may further incorporate predictive annotation capabilities, enabling the AI agent to anticipate likely next events based on historical patterns and propose pre-filled entries. This reduces latency in record-keeping and improves continuity across operational phases. Additionally, multi-agent collaboration may be employed, with specialized AI agents handling technical telemetry, narrative summaries, or compliance tagging in parallel. Coordination among these agents enhances coverage and efficiency while preserving semantic integrity.

Disclosed embodiments may also support integration with external data streams, such as video feeds, RF signals, or sensor outputs, allowing environmental context to be fused directly into the grammar-defined record. Privacy and security layers may be applied to restrict visibility of sensitive nodes, while adaptive grammar evolution ensures that the documentation structure remains aligned with evolving operational practices. In this way, disclosed embodiments can provide a scalable, extensible framework for intelligent documentation that adapts to the needs of both human operators and automated systems.

Accordingly, the scope of the present disclosure should not be limited to the particular implementations, workflows, or domain-specific examples described herein. Variations in system topology, data source integration, modeling techniques, operational roles, deployment environments, and user interface design are considered within the scope of the inventive concepts. Functional subsystems may be embodied in software, hardware, firmware, or any combination thereof, and may be deployed centrally, at the edge, or in hybrid configurations adapted to mission or organizational requirements. The claims are intended to cover all such modifications, equivalents, and variations as fall within the spirit and scope of the appended claims.

In various embodiments, the grammar-derived parse tree is not directly exposed to the AI agent during operation of the system illustrated in FIG. 8. Instead, the parse tree and its associated structural invariants are encapsulated behind a MCP interface that presents a compact set of typed intents and resource-bounded affordances (e.g., "classify event," "propose field values," "request subtree mutation," "validate against schema", etc.). By mediating access in this manner, the MCP interface transforms the agent's free-form proposals into constrained, schema-aware requests that the orchestration layer (e.g., AI Agent 150) can deterministically accept, adapt, or reject. This encapsulation reduces cognitive and computational load on the agent by abstracting away low-level node/edge details, breadth and depth of the tree, and intermediate normalization steps that would otherwise tax the agent's context window and reasoning capacity.

In some embodiments, the MCP interface maintains a stable contract that includes method signatures, preconditions, postconditions, and error semantics, but omits the internal tree representation and traversal state. The interface can further advertise only the next valid actions given the current document state and policy, thereby bounding the agent's branching factor and minimizing invalid or nonconforming edits. When the agent proposes an action that violates grammar constraints, data-type requirements, or organizational policy, the MCP server may return a structured refusal with machine-readable diagnostics and a shortlist of allowable alternatives, enabling iterative correction without revealing underlying tree topology.

In certain implementations, the MCP server also manages context compaction and summarization on behalf of the agent by packaging just the minimally sufficient cues (e.g., field stubs, schema excerpts, and localized diffs) required to produce useful outputs, while retaining full-fidelity structures internally for validation, reconciliation, and ledger synchronization. This separation of concerns improves robustness against prompt-level errors and injection attempts, permits deterministic enforcement of documentation rules, and enables the system to evolve the internal grammar and tree storage format without requiring changes to the agent prompts or behavior. Optionally, a privileged, human-operator view may render the parse tree for auditing and debugging, while the agent continues to interact exclusively through the MCP interface.

In various embodiments, FIG. 8 supports an architecture in which an AI agent interfaces with an MCP server that encapsulates the grammar-derived parse tree for an operational note. The agent does not obtain or traverse the internal tree structure; rather, it invokes typed MCP tools—such as classify event, propose field values, request constrained mutation, or validate against schema—that the MCP server maps to deterministic tree operations. Each tool declares parameter types, preconditions, postconditions, and error semantics. When a requested action would violate grammar constraints, data-type requirements, or organizational policy, the MCP server returns a structured refusal containing machine-readable diagnostics and a shortlist of permissible alternatives. In this way, the MCP server functions as a policy- and schema-aware mediation layer while the agent remains oblivious to node/edge topology, traversal state, or normalization routines.

In some implementations, the MCP server also performs context compaction on behalf of the agent by surfacing only the minimally sufficient cues (for example, field stubs, schema excerpts, localized diffs, and validation hints) required to complete the next action. The server may expose read-only resources that summarize current document state and prior decisions without revealing the full parse tree. Tool invocations that succeed commit deterministic edits to the underlying structure and can emit audit records for downstream synchronization or ledgering. Optionally, a privileged human operator view can render the internal tree for debugging and compliance review, while the agent continues to operate strictly through the MCP interface. This separation of concerns reduces cognitive and computational load on the agent, yields predictable and auditable outcomes, and permits the internal grammar and storage format to evolve without changing agent prompts or behavior.

Figure 9:
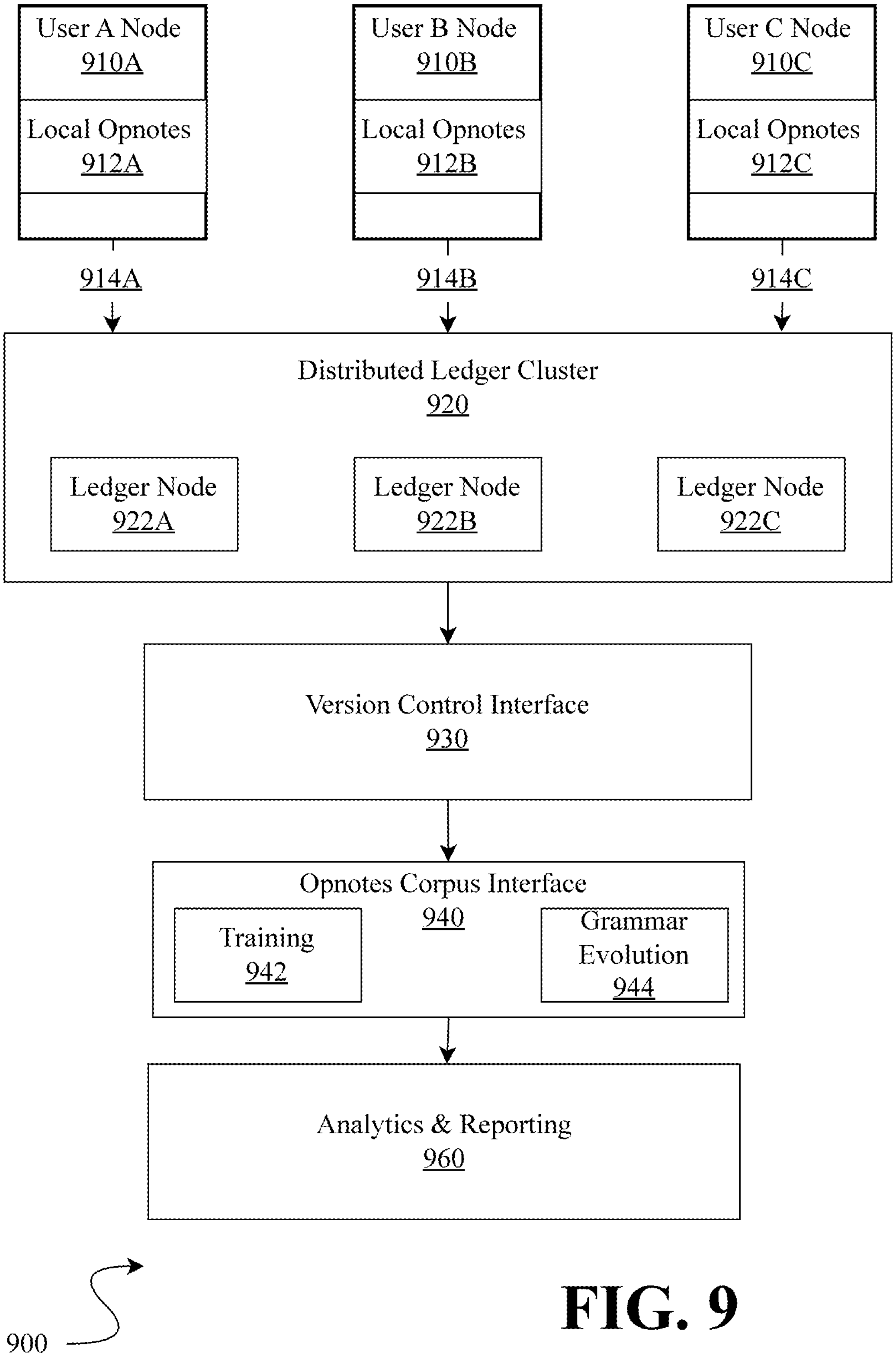
FIG. 9 is a block diagram illustrating an exemplary architecture for distributed multi-user synchronization and ledger-based management of operational documentation, according to an embodiment.

FIG. 9 is a block diagram illustrating an exemplary architecture for distributed multi-user synchronization and ledger-based management of operational documentation, referred to herein as the Opnotes Corpus Ledger 900. The architecture enables multiple analysts or operator nodes to collaboratively generate, modify, and validate operational notes in real time while maintaining cryptographic integrity, version control, and comprehensive auditability across a secure distributed network.

As shown in FIG. 9, three representative analyst nodes 910*a-c* are depicted to demonstrate concurrent multi-user operation, although any number of nodes may participate in practice. Each node corresponds to an operator terminal executing a local instance of an opnotes client application, represented by local opnotes instances 912*a*, 912*b*, and 912*c*. These local instances cache operational documentation entries created or edited by individual users, such as red-team operators, incident responders, and threat-hunting analysts. Each local instance maintains temporary state information including unsynchronized edits, session identifiers, and user-specific cryptographic keys.

Each analyst node 910*a*, 910*b*, and 910*c* communicates with a distributed ledger cluster 920 via synchronization channels 914*a*, 914*b*, and 914*c* that implement and pull operations. A commit operation transmits locally validated entries from a user node to the distributed ledger for consensus verification, while a pull operation retrieves the most recent committed state from the ledger to refresh the analyst's local copy. These synchronization operations are authenticated through digital signatures and transport-layer encryption to ensure confidentiality and non-repudiation.

The distributed ledger cluster 920 comprises a plurality of redundant ledger nodes 922*a*, 922*b*, and 922*c* interconnected by consensus propagation links. Each ledger node maintains an immutable record of operational entries organized into sequentially hashed blocks, each block containing timestamps, contributor identifiers, and hash references to preceding blocks. Consensus propagation ensures that all ledger nodes replicate the same canonical state through Byzantine-fault-tolerant or proof-of-authority protocols. This decentralized replication mitigates the risk of single-point failure and guarantees data integrity even under partial network compromise.

Within the ledger cluster 920, a conflict-resolution may continuously monitor for concurrent edits or branch divergences submitted by multiple users. When identical or overlapping parse-tree segments are modified simultaneously, the conflict-resolution engine computes a deterministic merge outcome by comparing version timestamps, user priority weights, and semantic deltas derived from the underlying grammar tree. This may automatically reconcile non-conflicting changes while flagging ambiguous cases for operator review through the validation interface.

Validated ledger entries are exported through a version control interface 930, which provides translation between the distributed ledger's block-structured format and higher-level version-control semantics such as branching, merging, rollback, and differential comparison. The interface 930 may implement APIs compatible with common version-control workflows, enabling developers or analysts to view opnote revisions, generate diffs, and restore prior states. The interface further attaches provenance metadata including commit identifiers, operator credentials, and digital signature verification results.

Downstream of the version-control interface 930, an Opnotes Corpus Interface 940 manages ingestion of validated documentation into persistent long-term storage. The corpus interface 940 may write to an enterprise database, secure data lake, or other repository corresponding to the Opnotes Corpus (180, as previously described). Embedded within the corpus interface are two key subsystems: a Training Module 942 and a Grammar Evolution Module

944. The training module 942 utilizes historical commit records and human-validation outcomes to refine machine-learning models used for confidence scoring and gap detection in subsequent AI agents. The grammar-evolution module 944 performs statistical analysis of accepted document structures to adapt parsing rules, extend recognized event ontologies, and optimize syntactic efficiency for future operational contexts.

All communication among user nodes 910*a*-910*c*, ledger nodes 922*a*-922*c*, and downstream interfaces occur within a secure network environment. The secure network may employ end-to-end encryption, mutual authentication, and network segmentation to prevent unauthorized access. The environment may be implemented as a virtual private cloud or a zero-trust enclave, ensuring that ledger consensus traffic and corpus updates are isolated from general enterprise networks.

An analytics and reporting module 960 interfaces with the corpus interface 940 to generate near-real-time operational intelligence products. The analytics module may compute metrics such as synchronization latency across nodes, completeness scores indicating the proportion of operational phases documented, and anomaly-density distributions measuring the frequency of divergent entries. The module 960 may further produce compliance and audit reports demonstrating adherence to documentation policies and security standards.

Through this distributed design, the architecture 900 ensures that all participating analysts share a consistent and verifiable operational picture without relying on centralized databases. Each entry within the ledger is immutable once validated, providing a tamper-evident audit trail suitable for forensics, accreditation, and regulatory compliance. The integration of version control 930 and grammar-evolution 944 mechanisms provides continuous self-improvement and knowledge retention across multiple operational campaigns.

Figure 10:
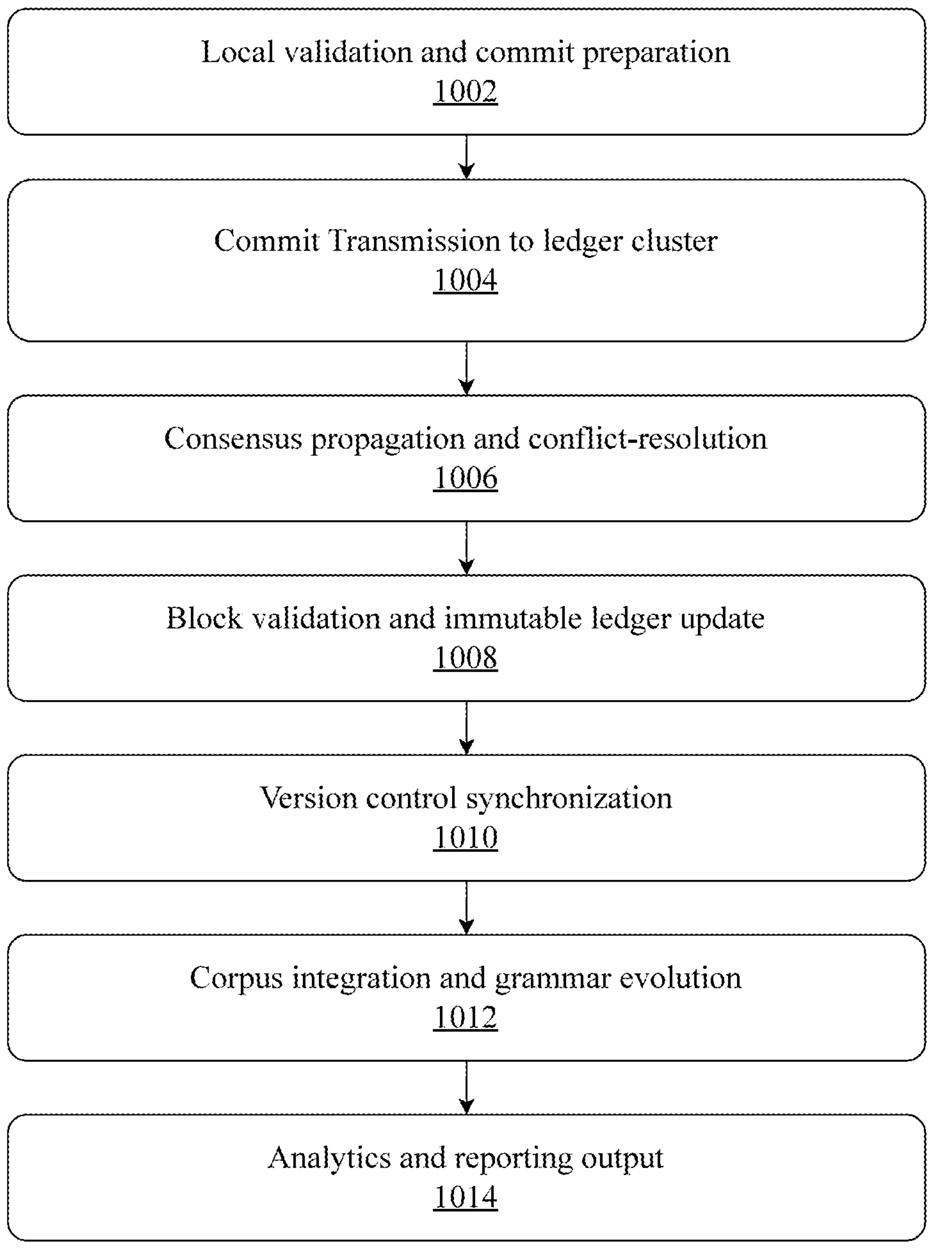
FIG. 10 is a flow diagram illustrating an exemplary method for the distributed multi-user synchronization and ledger-based documentation management within the system architecture, according to an embodiment.

FIG. 10 is a flow diagram illustrating an exemplary method for distributed multi-user synchronization and ledger-based documentation management within the system architecture. The method ensures that multiple geographically dispersed analysts can collaboratively maintain an authoritative, cryptographically verifiable record of operational notes (opnotes) while preserving concurrency control, data integrity, and audit transparency.

At step 1002, the process begins when one or more operators (e.g., red-team analysts, threat-hunting personnel, or incident responders) generate or modify local operational notes using their respective client terminals, corresponding to nodes 910*a*-910*c* in FIG. 9. Each local instance 912*a*-912*c* executes a documentation client that captures analyst inputs, such as textual observations, command-line transcripts, detected anomalies, and remediation steps. As operators enter data, the client application automatically applies domain-specific grammar validation to ensure syntactic conformity with a predefined opnote schema (e.g., actor-action-object-timestamp-jurisdiction). Each entry is automatically timestamped, tagged with an operator identifier, and associated with the relevant operational campaign. Each client performs local validation and commit preparation. This involves verifying that required grammar fields are populated, ensuring internal semantic coherence, and hashing the proposed modification to create a digital fingerprint representing the change set. The validation routine may include anomaly detection to flag malformed syntax or incomplete event structures. Once validated, the update is encapsulated into a commit payload containing the hashed content, metadata headers, and cryptographic signature generated using the operator's private key. The commit payload also embeds a parent reference pointer, linking the update to the immediately preceding ledger state known to the client, thereby preserving linear revision history.

At step 1004, the commit payload is transmitted to a distributed ledger cluster 920 via the secure communication channels 914*a*-914*c*. Each payload is queued by a receiving ledger node (e.g., 922*a*) and broadcast to peer nodes 922*b*-922*c* through consensus propagation links. During this broadcast, each ledger node performs an independent validation of the payload, verifying the cryptographic signature, timestamp freshness, and parent-hash integrity. If any node identifies an inconsistency or hash mismatch, it rejects the block and issues a remediation request back to the originating client for re-submission. Valid payloads are aggregated into a proposed block for consensus evaluation.

At step 1006, the distributed ledger cluster executes a consensus propagation and conflict-resolution process. Ledger nodes exchange proposed blocks and perform deterministic comparison operations to identify concurrent submissions affecting the same parse-tree region or semantic entity. Conflict-Resolution computes a merge outcome by evaluating several criteria: timestamp precedence, contributor confidence weights derived from role hierarchy, and semantic deltas between node structures. When two updates modify non-overlapping branches of the parse tree, the engine merges them automatically; when overlap occurs, the engine generates a composite candidate block and submits it for human review via the validation interface. Upon reaching quorum (e.g., 2-of-3 or 3-of-5 agreement, depending on configuration), the finalized block is cryptographically sealed and appended to the ledger chain, creating a tamper-evident record.

At step 1008, the ledger's confirmed block sequence becomes the canonical documentation state. The block, containing multiple validated opnote entries, is then exposed through the Version Control Interface 1010. In this step 1010, the interface translates ledger transactions into higher-level revision-control constructs such as branches, merges, and rollback checkpoints. The interface automatically generates globally unique revision identifiers and cross-references them to operator credentials and timestamps. Through this mechanism, each change is traceable to its originator, enabling investigators to reconstruct documentation lineage with full provenance metadata.

At step 1012, the validated data propagates through the Opnotes Corpus Interface 940 into long-term persistent storage. This corpus may reside on redundant database clusters, versioned object stores, or blockchain-anchored archives. During ingestion, the corpus interface normalizes all incoming entries, reconciles cross-references to related incidents, and indexes fields such as event type, system identifier, and contextual tags. The training module leverages historical commit data, including operator accept/reject decisions from validation workflows, to continuously fine-tune the machine-learning classifiers used in the AI agent's gap-detection and confidence-scoring subsystems. The grammar-evolution module performs statistical analysis across the corpus to identify recurring syntactic structures, emergent event types, and semantic drift, dynamically updating parsing rules to ensure continued alignment with operational reality.

At step 1014, the system executes analytics and reporting operations through module 960. As the corpus evolves, analytics engines compute documentation-completeness scores quantifying how thoroughly each operational phase was captured, latency metrics reflecting synchronization delay between ledger commits, and anomaly-density statistics indicating the proportion of entries flagged for correction. These outputs are visualized in dashboards and can trigger automated compliance reports demonstrating adherence to regulatory or internal quality standards. Optionally, causal-chain analysis reconstructs incident timelines by linking initial intrusion events to subsequent remediation actions, supporting forensic review and after-action reporting.

In some embodiments, the process includes a continuous feedback loop in which analytics insights and grammar-evolution results are relayed back to the grammar engine and AI agent described in FIGS. 2-8. This closed-loop architecture ensures that operational documentation becomes progressively more accurate, context-aware, and semantically rich over time, while maintaining formal consistency through grammar-based constraints and verified ledger synchronization.

The described sequence thus provides a fully enabled implementation for real-time, distributed documentation management in high-tempo cyber-operations environments. Unlike conventional systems relying on centralized databases or unverified log aggregation, the disclosed method ensures immutable provenance of every record through cryptographic consensus, supports concurrent editing through deterministic conflict-resolution algorithms, and achieves continuous improvement through integrated training and grammar-evolution pipelines. The result is a verifiable, auditable, and self-adapting documentation framework that harmonizes automation with human oversight while preserving operational integrity across distributed teams.

Figure 11:
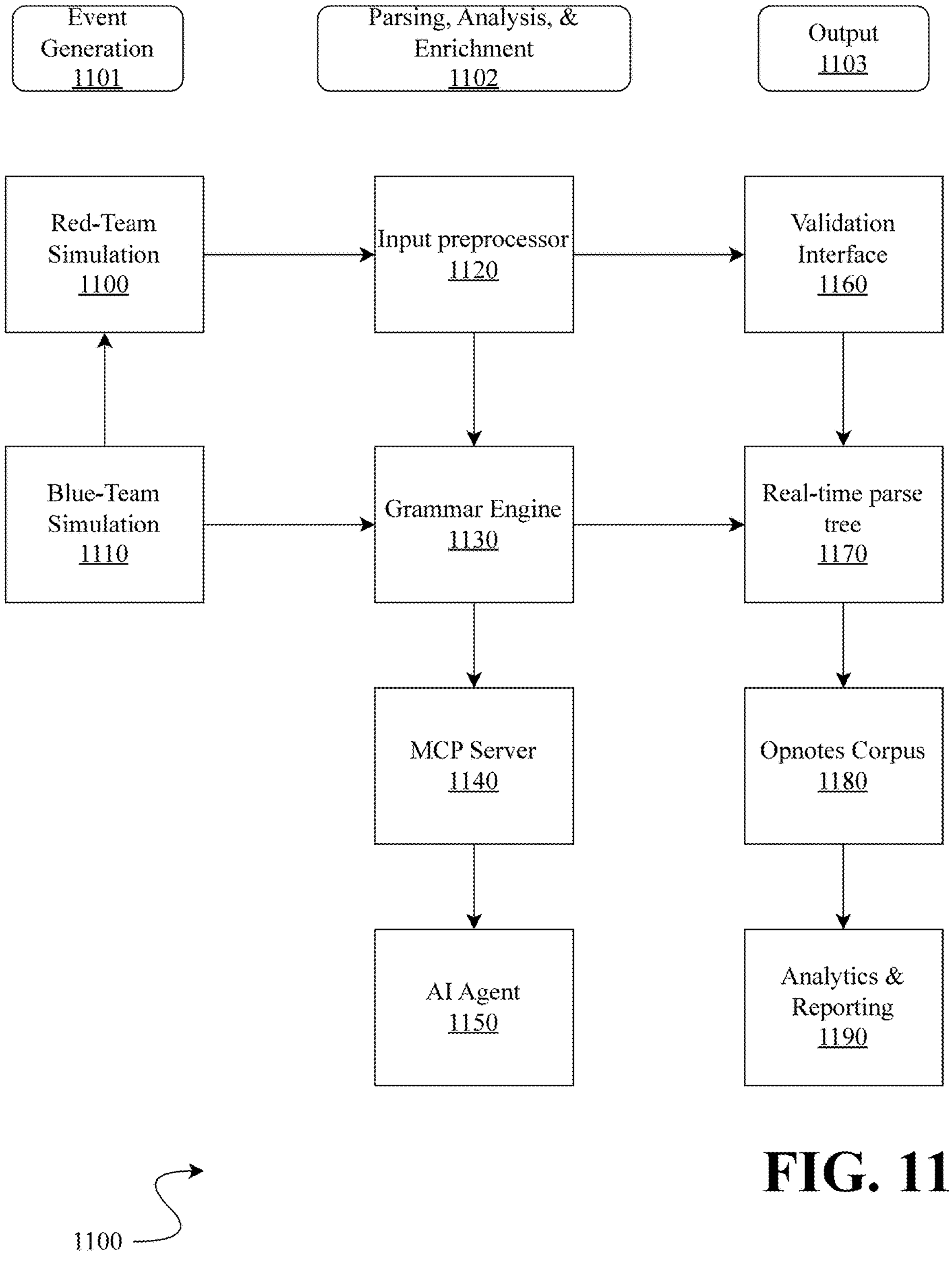
FIG. 11 is an exemplary data flow for cyber-operations documentation, depicting how simulated adversarial events and defensive telemetry traverse the grammar-based parsing, according to an embodiment.

FIG. 11 is a flow diagram of an exemplary data flow 1100 for cyber-operations documentation, depicting how simulated adversarial events and defensive telemetry traverse the grammar-based parsing, Model Context Protocol (MCP) orchestration, AI reasoning, and validation pipeline to produce structured, context-optimized operational records. FIG. 11 demonstrates how the disclosed system processes tangible machine-generated signals rather than abstract linguistic content, grounding the claimed subject matter in real cybersecurity telemetry.

This begins with event generation 1101. Red-Team Simulation Module 1100 and Blue-Team Response Module 1110 collectively generate the multi-modal event streams ingested by the system. Red-Team Module 1100 emulates adversarial behavior consistent with established frameworks such as MITRE ATT&CK, producing telemetry that includes network intrusion attempts, phishing payload deliveries, privilege-escalation chains, lateral movement traces, and exfiltration events. The module may run on virtualized test networks, containerized penetration-testing environments, or dedicated cyber-range infrastructures. Each simulated event is logged with a timestamp, source and destination IP addresses, associated process identifiers, and command-execution metadata.

Concurrently, Blue-Team Response Module 1110 captures the defensive side of the engagement. This includes intrusion-detection and prevention system (IDS/IPS) alerts, firewall connection logs, endpoint-detection telemetry, authentication failures, network-sensor packet captures, and human-authored SOC analyst notes describing mitigation and containment activities. These datasets originate from distinct sensors with heterogeneous formats such as JSON, syslog, CSV, and proprietary binary structures, creating the need for the normalization pipeline described below within the parsing, analysis, and enrichment phase 1102.

The incoming data feeds converge at an input preprocessor 1120, which serves as the ingestion and normalization layer of the system. The preprocessor performs multi-stage transformation: (i) format normalization to unify differing schemas; (ii) timestamp harmonization across devices with independent clocks, leveraging network-time-protocol corrections; (iii) deduplication using content-hash comparison; (iv) semantic tokenization to segment continuous log streams into discrete atomic events; and (v) metadata enrichment. The enrichment operation appends contextual tags such as sensor origin, operator role, confidence level, network segment, and geolocation of the endpoint. The preprocessor further applies encryption at rest using symmetric algorithms (e.g., AES-256) and employs asymmetric key exchange for secure credential management, ensuring confidentiality during intermediate storage and transmission. The result is a unified, semantically annotated input stream ready for grammatical analysis.

The normalized stream is then processed by a grammar engine 1130, which converts the heterogeneous telemetry into a structured syntactic representation known as an Initial Parse Tree. The grammar engine operates under a formal grammar expressed in Backus-Naur Form or equivalent notation, organizing each event into canonical roles such as actor, action, object, timestamp, status, and jurisdiction. The engine detects missing or underspecified nodes, such as absent actor identifiers or incomplete time ranges, and flags them for downstream augmentation. It also computes structural consistency metrics and attaches parse-tree confidence scores reflecting syntactic fidelity. The initial parse tree is transmitted to the model context protocol (MCP) server 1140, which coordinates specialized analytical modules. These modules provide domain-specific reasoning layers that enhance situational understanding: the threat correlation module aggregates related events across hosts, users, and network boundaries to identify coordinated attack campaigns. It computes similarity vectors for indicators such as hash values, IP adjacency, and temporal correlation windows, outputting clustered threat entities. The vulnerability linker module associates observed exploitation attempts with external vulnerability databases such as CVE and NVD. It retrieves CVSS severity scores, patch availability, and remediation recommendations, enriching the parse tree with actionable vulnerability context. The incident replay module reconstructs attack sequences by simulating the temporal and causal order of events. It can emulate adversary tactics to verify detection coverage or replay defense responses for training and forensic review. The MCP server performs selective context exposure by analyzing relevance thresholds, asset criticality, and operator authorization, ensuring that only the necessary subtrees are passed downstream to conserve computational resources and maintain operational security.

The refined subtree is analyzed by AI Agent 1150 that performs context-aware documentation augmentation. The agent comprises three subsystems: a Gap-Detection Subsystem that identifies incomplete grammatical nodes; a Grammar-Compliant Insertion Generator that proposes candidate insertions; and a Confidence-Scoring Subsystem that quantifies the reliability of each proposed insertion. The agent references historical opnotes, network-traffic archives, and firewall configurations to infer missing entities such as command parameters, actor identities, or exploited ports. It assigns probability distributions to each hypothesis using ensemble models trained on historical incident data, then outputs candidate augmentations tagged with explanatory metadata and reasoning provenance.

At the output stage 1103, proposed augmentations are reviewed through a validation interface 1160, which enforces human-in-the-loop oversight. The interface presents each insertion with its confidence score, associated evidence, and provenance trace. Analysts can accept accurate suggestions, edit partial ones, reject false positives, or redact sensitive information prior to ledger submission. All operator interactions are digitally signed, time-stamped, and recorded in an audit log to ensure traceability. The interface supports batch review for high-volume event processing and may integrate with security-information-and-event-management (SIEM) dashboards for contextual visualization.

Accepted updates are committed into a real-time parse tree 1170, which maintains the authoritative operational documentation state. The real-time parse tree is synchronized across distributed users using the ledger and version-control protocols described in FIG. 9. Each validated insertion is assigned a block identifier and propagated through the consensus mechanism to ensure immutability. The parse tree thus becomes a live, evolving representation of cyber-operations activity, continuously refined by both AI inference and human judgment.

The synchronized tree and its derivatives are archived in an Opnotes Corpus 1180, which acts as the persistent historical repository for finalized operational records. Within this corpus, a Training Subsystem retrains the AI models based on accumulated human validation data, adjusting weighting parameters to reduce future error rates, while a Grammar Evolution Subsystem performs statistical grammar optimization. The evolution process identifies emerging terminology, new attack categories, and novel event correlations, updating rule sets accordingly to preserve parsing accuracy as the cyber threat landscape changes.

Finally, this feeds into an analytics and reporting Module 1190 that produces operational intelligence outputs. These include documentation-completeness indices measuring coverage across incident phases; temporal-latency metrics indicating synchronization delay between event occurrence and documentation; anomaly-density maps showing the frequency of low-confidence insertions; and causal-chain reconstructions linking initial intrusion vectors to remediation outcomes. The analytics module may further generate compliance dashboards demonstrating adherence to documentation policies and security frameworks such as NIST 800-53 or ISO 27035.

Through the interactions of modules 1100-1190, the architecture provides a tangible end-to-end workflow that converts real or simulated cyber events into structured, validated records with traceable provenance. The process leverages concrete computing components—network sensors, parsing engines, machine-learning models, distributed ledgers, and user interfaces—to achieve a technical improvement in the accuracy, consistency, and auditability of operational documentation. Thus, FIG. 11 exemplifies the cyber-specific embodiment of the disclosed invention, demonstrating the transformation of live network data into grammar-enforced, context-optimized documentation within a verifiable multi-user system.

Exemplary Computing Environment

Figure 12:
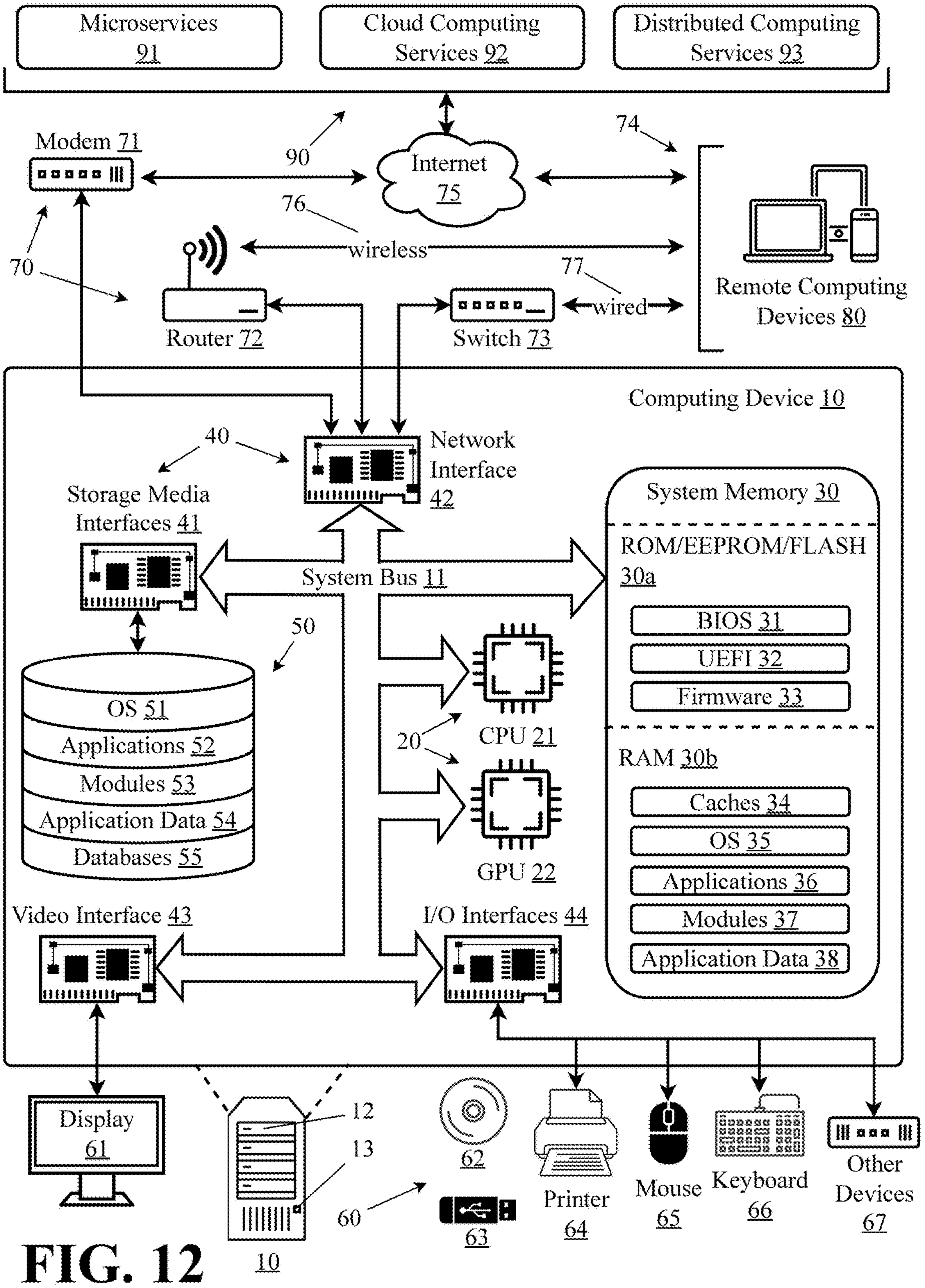
FIG. 12 illustrates an exemplary computing environment on which an embodiment described herein may be implemented, in full or in part.

FIG. 12 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure. The memory can include a non-transitory computer-readable medium.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 13 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, and low latency, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities. NAND flash memory comes in different types, such as Single-Level Cell (SLC), Multi-Level Cell (MLC), Triple-Level Cell (TLC), and Quad-Level Cell (QLC), each with trade-offs between performance, and endurance. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as performance and availability. For example, Terraform can be used to automatically provision and scale resources on AWS spot instances during periods of high demand, such as for surge rendering tasks, to take advantage while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a container file or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for artificial intelligence (AI) assisted recording of operational events, the computing system comprising one or more hardware processors configured for:

receiving an activity feed;

inputting the activity feed to an input preprocessor to create a preprocessed input stream;

inputting the preprocessed input stream to a grammar engine comprising a parser that enforces a plurality of predefined syntactic rules to parse the preprocessed input stream, wherein the grammar engine is configured and disposed to generate an initial parse tree, wherein the initial parse tree is based on operational activity;

providing the initial parse tree to a Model Context Protocol (MCP) server, wherein the MCP server executes one or more MCP tools;

executing an AI agent, wherein the AI agent is configured to monitor operational activity, and analyze the initial parse tree to detect documentation gaps;

generating one or more grammar-compliant insertions based on the detected documentation gaps;

creating a real-time parse tree by copying the initial parse tree; and updating the real-time parse tree to include the one or more grammar-compliant insertions in an operational notes file structure.

2. The computing system of claim 1, further configured to provide the one or more grammar-compliant insertions to a human operator for validation.

3. The computing system of claim 1, wherein the AI agent is further configured to perform automated cross-referencing between related events based on shared attributes.

4. The computing system of claim 3, wherein the shared attributes include at least one of timestamps, operational context, and actor identity.

5. The computing system of claim 1, wherein the MCP server is configured to expose subtrees based on a predetermined condition.

6. The computing system of claim 5, wherein the predetermined condition includes at least one of a relevance threshold and an operational priority.

7. The computing system of claim 6, wherein the relevance threshold is determined based on semantic proximity to recent operational events.

8. The computing system of claim 1, wherein the real-time parse tree includes a Concrete Syntax Tree (CST).

9. The computing system of claim 1, wherein the real-time parse tree includes an Abstract Syntax Tree (AST).

10. The computing system of claim 1, wherein the computing system is further configured for multi-user operation across distributed teams, and wherein the real-time parse tree is synchronized across multiple user sessions in real time.

11. The computing system of claim 10, wherein real-time synchronization of the real-time parse tree across multiple user sessions is achieved using one or more of, a distributed ledger, a version control protocol, a conflict resolution engine that compares version timestamps, user priority weights, and semantic deltas derived to reconcile concurrent edits, and a synchronization service configured to propagate validated changes to all active user interfaces.

12. The computing system of claim 1, wherein the computing system is further configured to generate analytic outputs based on the real-time parse tree, the analytic outputs comprising one or more of statistical summaries, causal chains, documentation completeness scores, and anomaly density metrics.

13. The computing system of claim 1, wherein the operational notes file structure includes a field for storing a timestamp, wherein the timestamp indicates when an operational event was recorded.

14. The computing system of claim 13, wherein the operational notes file structure includes a field for specifying an event type, wherein the event type is selected from a predefined set of categories including command execution, system response, and operator observation.

15. The computing system of claim 14, wherein the operational notes file structure includes one or more fields for storing technical details associated with the operational event, the technical details comprising at least one of system identifiers, command parameters, output values, and contextual metadata.

16. A computer-implemented method for artificial intelligence (AI) assisted recording of operational events, the method comprising:
- receiving an activity feed;
- inputting the activity feed to an input preprocessor to create a preprocessed input stream;
- inputting the preprocessed input stream to a grammar engine comprising a parser that enforces a plurality of predefined syntactic rules to parse the preprocessed input stream, wherein the grammar engine is configured and disposed to generate an initial parse tree, wherein the initial parse tree is based on operational activity;
- providing the initial parse tree to a Model Context Protocol (MCP) server, wherein the MCP server executes one or more MCP tools;
- executing an AI agent, wherein the AI agent is configured to monitor operational activity, and analyze the initial parse tree to detect documentation gaps;
- generating one or more grammar-compliant insertions based on the detected documentation gaps; and
- creating a real-time parse tree by copying the initial parse tree; and
- updating the real-time parse tree to include the one or more grammar-compliant insertions in an operational notes file structure.

17. The method of claim 16, further comprising generating analytic outputs based on the real-time parse tree, the analytic outputs comprising one or more of statistical summaries, causal chains, documentation completeness scores, and anomaly density metrics.

18. The method of claim 16, further comprising performing real-time synchronization of the real-time parse tree across multiple user sessions is achieved using one or more of, a distributed ledger, a version control protocol, a conflict resolution engine that compares version timestamps, user priority weights, and semantic deltas derived to reconcile concurrent edits, and a synchronization service configured to propagate validated changes to all active user interfaces.

19. The method of claim 16, further comprising performing automated cross-referencing between related events based on shared attributes.

20. A non-transitory computer-readable medium comprising programming instructions for an electronic computation device executable by one or more processors to cause the electronic computation device to:
- receive an activity feed;
- input the activity feed to an input preprocessor to create a preprocessed input stream;
- input the preprocessed input stream to a grammar engine comprising a parser that enforces a plurality of predefined syntactic rules to parse the preprocessed input stream, wherein the grammar engine is configured and disposed to generate an initial parse tree, wherein the initial parse tree is based on operational activity;
- provide the initial parse tree to a Model Context Protocol (MCP) server, wherein the MCP server executes one or more MCP tools;
- execute an AI agent, wherein the AI agent is configured to monitor operational activity, and analyze the initial parse tree to detect documentation gaps;
- generate one or more grammar-compliant insertions based on the detected documentation gaps;
- create a real-time parse tree by copying the initial parse tree; and
- update the real-time parse tree to include the one or more grammar-compliant insertions in an operational notes file structure.

* * * * *